United States Patent
Pai et al.

(10) Patent No.: US 10,103,934 B2
(45) Date of Patent: Oct. 16, 2018

(54) SETTING A REMINDER THAT IS TRIGGERED BY A TARGET USER DEVICE

(71) Applicant: Apple Inc., Cupertino, CA (US)

(72) Inventors: Ragu Pai, Cupertino, CA (US); Joshua B. Dickens, Menlo Park, CA (US); Karthik Narayanan, Cupertino, CA (US); Megan M. Frost, San Francisco, CA (US); Patrice Olivier Gautier, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 138 days.

(21) Appl. No.: 15/004,786

(22) Filed: Jan. 22, 2016

(65) Prior Publication Data
US 2016/0234060 A1    Aug. 11, 2016

Related U.S. Application Data

(63) Continuation of application No. 13/488,430, filed on Jun. 4, 2012, now Pat. No. 9,247,377, which is a
(Continued)

(51) Int. Cl.
*G06F 15/16*    (2006.01)
*H04L 12/24*    (2006.01)
(Continued)

(52) U.S. Cl.
CPC ....... *H04L 41/0681* (2013.01); *G06Q 10/109* (2013.01); *H04L 51/20* (2013.01);
(Continued)

(58) Field of Classification Search
CPC .......... H04L 51/20; H04L 67/22–67/24; H04L 67/18; H04W 4/02–4/025; H04W 64/00; H04W 64/003
See application file for complete search history.

(56) References Cited

U.S. PATENT DOCUMENTS 7,015,817 B2 *  3/2006  Copley .............. G08B 21/0283
                                                340/539.13
7,076,257 B2    7/2006  Kall
(Continued)

FOREIGN PATENT DOCUMENTS

CN    1475924 A      2/2004
CN    102098656      6/2011
(Continued)

OTHER PUBLICATIONS

European Extended Search Report in Application No. 16155938.0, dated Jun. 7, 2016, 8 pages.
(Continued)

*Primary Examiner* — Brendan Higa
(74) *Attorney, Agent, or Firm* — Fish & Richardson P.C.

(57) ABSTRACT

Disclosed are systems, methods, and non-transitory computer-readable storage media for setting a reminder triggered by a target device. A requesting device sends a request to a server to set a reminder triggered by a target device. The request includes parameters, such as a location and a condition that define when the reminder is triggered. The server sends instruction to the target device to set the reminder based on the parameters. When the condition such as arrival is met by the target device in relation to the location the target device sends a message to the server that the reminder has been triggered. The target device can set a geo-fence to determine the position of the target device in relation to the location, and the requesting user can dictate the size of the geo-fence. The server sends a notification to the requesting device that the reminder has been triggered.

20 Claims, 29 Drawing Sheets

Related U.S. Application Data continuation-in-part of application No. 13/113,856, filed on May 23, 2011, now Pat. No. 8,971,924.

(51) Int. Cl.

| | | |
|---|---|---|
| *H04L 12/58* | (2006.01) | |
| *H04W 4/02* | (2018.01) | |
| *G06Q 10/10* | (2012.01) | |
| *H04L 29/08* | (2006.01) | |
| *H04L 29/06* | (2006.01) | |
| *H04W 4/021* | (2018.01) | |
| *H04W 64/00* | (2009.01) | |
| *H04W 4/21* | (2018.01) | |

(52) U.S. Cl.
CPC .............. *H04L 67/18* (2013.01); *H04L 67/42* (2013.01); *H04W 4/02* (2013.01); *H04W 4/021* (2013.01); *H04W 4/21* (2018.02); *H04W 64/00* (2013.01)

(56) References Cited

U.S. PATENT DOCUMENTS

| | | | |
|---|---|---|---|
| 7,224,987 B1 | 5/2007 | Bhela | |
| 7,801,542 B1 | 9/2010 | Stewart | |
| 8,244,468 B2 | 8/2012 | Scailisi et al. | |
| 8,369,867 B2 | 2/2013 | Van Os et al. | |
| 8,374,575 B2 | 2/2013 | Mullen | |
| 8,412,154 B1* | 4/2013 | Leemet | H04M 15/58 |
| | | | 455/406 |
| 8,441,367 B1* | 5/2013 | Lee | G08B 21/18 |
| | | | 340/539.13 |
| 8,786,458 B1* | 7/2014 | Wiltzius | G08B 27/005 |
| | | | 340/691.6 |
| 8,855,665 B2 | 10/2014 | Buford et al. | |
| 8,971,924 B2 | 3/2015 | Pai et al. | |
| 8,989,773 B2 | 3/2015 | Sandel et al. | |
| 9,204,283 B2 | 12/2015 | Mullen | |
| 9,247,377 B2 | 1/2016 | Pai et al. | |
| 9,294,882 B2 | 3/2016 | Sandel et al. | |
| 9,369,833 B2 | 6/2016 | Tharshanan et al. | |
| 9,402,153 B2 | 7/2016 | Pai et al. | |
| 9,635,540 B2 | 4/2017 | Mullen | |
| 9,699,617 B2 | 7/2017 | Sandel et al. | |
| 2002/0102989 A1 | 8/2002 | Calvert et al. | |
| 2003/0128163 A1 | 7/2003 | Mizugaki et al. | |
| 2004/0180669 A1 | 9/2004 | Kall | |
| 2004/0203854 A1 | 10/2004 | Nowak | |
| 2005/0032532 A1 | 2/2005 | Kokkonen et al. | |
| 2005/0148340 A1 | 7/2005 | Guyot | |
| 2005/0222756 A1 | 10/2005 | Davis et al. | |
| 2005/0288036 A1 | 12/2005 | Brewer et al. | |
| 2006/0030333 A1* | 2/2006 | Ward | G01S 5/0205 |
| | | | 455/456.1 |
| 2006/0063538 A1 | 3/2006 | Ishii | |
| 2006/0223518 A1 | 10/2006 | Haney | |
| 2007/0129888 A1 | 6/2007 | Rosenberg | |
| 2008/0004043 A1 | 1/2008 | Wilson et al. | |
| 2008/0045232 A1 | 2/2008 | Cone et al. | |
| 2008/0139219 A1 | 6/2008 | Boeiro et al. | |
| 2008/0176583 A1 | 7/2008 | Brachet et al. | |
| 2008/0186165 A1* | 8/2008 | Bertagna | G08B 21/0227 |
| | | | 340/539.13 |
| 2008/0287151 A1 | 11/2008 | Fjelstad et al. | |
| 2009/0005018 A1 | 1/2009 | Forstall et al. | |
| 2009/0006566 A1 | 1/2009 | Veeramachaneni et al. | |
| 2009/0011340 A1 | 1/2009 | Lee et al. | |
| 2009/0066564 A1 | 3/2009 | Burroughs et al. | |
| 2009/0085806 A1* | 4/2009 | Piersol | G01C 21/206 |
| | | | 342/386 |
| 2009/0098903 A1 | 4/2009 | Donaldson et al. | |
| 2009/0113340 A1 | 4/2009 | Bender | |
| 2009/0303066 A1 | 12/2009 | Lee et al. | |
| 2009/0312032 A1 | 12/2009 | Bornstein et al. | |
| 2009/0319616 A1 | 12/2009 | Lewis et al. | |
| 2009/0322560 A1* | 12/2009 | Tengler | G08G 1/0104 |
| | | | 340/905 |
| 2009/0325603 A1 | 12/2009 | Van Os et al. | |
| 2010/0004005 A1 | 1/2010 | Pereira et al. | |
| 2010/0017126 A1 | 1/2010 | Holeman | |
| 2010/0069035 A1 | 3/2010 | Jonhson | |
| 2010/0125411 A1 | 5/2010 | Goel | |
| 2010/0144368 A1 | 6/2010 | Sullivan | |
| 2010/0203901 A1* | 8/2010 | Dinoff | H04W 4/022 |
| | | | 455/456.3 |
| 2010/0205242 A1 | 8/2010 | Marchioro, II et al. | |
| 2010/0211425 A1* | 8/2010 | Govindarajan | G01C 21/34 |
| | | | 705/7.16 |
| 2010/0240398 A1 | 9/2010 | Hotes et al. | |
| 2010/0248744 A1 | 9/2010 | Bychkov et al. | |
| 2010/0250727 A1 | 9/2010 | King et al. | |
| 2010/0274569 A1 | 10/2010 | Reudink | |
| 2010/0287178 A1 | 11/2010 | Lambert et al. | |
| 2010/0299060 A1 | 11/2010 | Snavely et al. | |
| 2010/0325194 A1 | 12/2010 | Williamson et al. | |
| 2010/0330952 A1* | 12/2010 | Yeoman | H04M 1/72541 |
| | | | 455/404.2 |
| 2011/0051658 A1 | 3/2011 | Jin et al. | |
| 2011/0054780 A1* | 3/2011 | Dhanani | G01C 21/26 |
| | | | 701/465 |
| 2011/0054979 A1 | 3/2011 | Cova et al. | |
| 2011/0066743 A1 | 3/2011 | Hurley | |
| 2011/0118975 A1 | 5/2011 | Chen | |
| 2011/0137813 A1 | 6/2011 | Stewart | |
| 2011/0137954 A1 | 6/2011 | Diaz | |
| 2011/0138006 A1 | 6/2011 | Stewart | |
| 2011/0148626 A1 | 6/2011 | Acevedo | |
| 2011/0250909 A1 | 10/2011 | Mathias | |
| 2011/0279323 A1 | 11/2011 | Hung et al. | |
| 2011/0306366 A1 | 12/2011 | Trussel et al. | |
| 2011/0307124 A1 | 12/2011 | Morgan et al. | |
| 2012/0008526 A1 | 1/2012 | Borghei | |
| 2012/0040681 A1 | 2/2012 | Yan et al. | |
| 2012/0054028 A1 | 3/2012 | Tengler et al. | |
| 2012/0077463 A1 | 3/2012 | Robbins et al. | |
| 2012/0088521 A1 | 4/2012 | Nishida et al. | |
| 2012/0095918 A1 | 4/2012 | Jurss | |
| 2012/0136997 A1 | 5/2012 | Yan et al. | |
| 2012/0144452 A1 | 6/2012 | Dyor | |
| 2012/0166531 A1 | 6/2012 | Sylvain et al. | |
| 2012/0222083 A1 | 8/2012 | Vaha-Sipila et al. | |
| 2012/0258726 A1 | 10/2012 | Bansal et al. | |
| 2012/0265823 A1 | 10/2012 | Parmar et al. | |
| 2012/0276919 A1* | 11/2012 | Bi | H04W 48/04 |
| | | | 455/456.1 |
| 2012/0290648 A1 | 11/2012 | Sharkey | |
| 2012/0302256 A1 | 11/2012 | Pai et al. | |
| 2012/0302258 A1 | 11/2012 | Pai et al. | |
| 2013/0045759 A1 | 2/2013 | Smith et al. | |
| 2013/0143586 A1* | 6/2013 | Williams | G06Q 30/0261 |
| | | | 455/456.1 |
| 2013/0226453 A1 | 8/2013 | Trussel et al. | |
| 2013/0303190 A1 | 11/2013 | Khan et al. | |
| 2013/0305331 A1 | 11/2013 | Kim | |
| 2014/0062790 A1 | 3/2014 | Letz et al. | |
| 2014/0099973 A1 | 4/2014 | Cecchini et al. | |
| 2014/0237126 A1 | 8/2014 | Bridge | |
| 2015/0180746 A1* | 6/2015 | Day, II | H04L 51/16 |
| | | | 455/405 |
| 2015/0346912 A1 | 12/2015 | Yang et al. | |
| 2015/0350130 A1 | 12/2015 | Yang et al. | |
| 2015/0350140 A1 | 12/2015 | Garcia et al. | |
| 2015/0350141 A1 | 12/2015 | Yang et al. | |
| 2016/0036735 A1 | 2/2016 | Pycock et al. | |
| 2016/0073223 A1 | 3/2016 | Woolsey et al. | |

FOREIGN PATENT DOCUMENTS

| | | |
|---|---|---|
| EP | 1 387 590 | 2/2004 |
| JP | 2003-516057 | 5/2003 |
| JP | 2003-207556 | 7/2003 |
| JP | 2009-081865 | 4/2009 |

(56) References Cited

FOREIGN PATENT DOCUMENTS

| | | |
|---|---|---|
| JP | 2010-288162 | 12/2010 |
| JP | 2010-539804 | 12/2010 |
| JP | 2011-060065 | 3/2011 |
| KR | 10-2007-0096222 | 10/2007 |
| KR | 10-2008-0074813 | 8/2008 |
| WO | WO 2001/041468 | 6/2001 |
| WO | WO 2002/003093 | 1/2002 |
| WO | WO 2010/048995 | 5/2010 |
| WO | WO 2011/080622 | 7/2011 |

OTHER PUBLICATIONS

Chinese Office Action for Application No. 201210288784.3, dated Jan. 5, 2017, 14 pages.
India Office Action for Application No. 2030/CHE/2012, dated Dec. 27, 2016, 9 pages.
Australian Patent Examination Report No. 1 in Australian Application No. 2012202929, dated Sep. 28, 2013, 3 pages.
Chinese Office Action in Chinese Application No. 201210288784.3, dated Jul. 3, 2014, 16 pages.
European Search Report in European Application No. 12168980.6, dated Sep. 21, 2012, 7 pages.
International Preliminary Report on Patentability in International Application No. PCT/US/2012/038718, dated Nov. 26, 2013, 5 pages.
International Search Report in International Application No. PCT/US2012/038718, dated Aug. 17, 2012, 5 pages.
International Search Report and Written Opinion in International Application No. PCT/US13/41780, dated Dec. 1, 2014, 18 pages.
International Preliminary Report on Patentability in International Application No. PCT/US13/41780, dated Dec. 9, 2014, 8 pages.
Japanese Office Action in Japanese Application No. 2012-113725, dated May 27, 2013, 5 pages.
Korean Preliminary Rejection in Korean Application No. 10-2012-54888, dated Sep. 5, 2014, 9 pages (with English Translation).
Search and Examination Report in GB Application No. GB1209044.5, dated Aug. 24, 2012, 10 pages.
U.S. Final Office Action in U.S. Appl. No. 13/113,856, dated Nov. 7, 2012, 19 pages.
U.S. Final Office Action in U.S. Appl. No. 13/488,430, dated May 8, 2013, 19 pages.
U.S. Non-Final Office Action in U.S. Appl. No. 13/113,856, dated Jul. 18, 2012, 14 pages.
U.S. Non-Final Office Action in U.S. Appl. No. 13/488,430, dated Dec. 5, 2012, 13 pages.
Written Opinion in International Application No. PCT/US/2012/038718, dated Aug. 17, 2012, 4 pages.
Australian Patent Examination Report No. 1 in Australian Application No. 2013203926, dated Oct. 7, 2014, 5 pages.
Australian Patent Examination Report No. 2 in Australian Application No. 2013203926, dated Jan. 13, 2016, 3 pages.
Chinese Notification of Reexamination for Application No. 201210288784.3, dated Sep. 27, 2017, 18 pages.

\* cited by examiner

SETTING A REMINDER THAT IS TRIGGERED BY A TARGET USER DEVICE

CROSS REFERENCE TO RELATED APPLICATIONS

This application is a continuation of U.S. patent application Ser. No. 13/488,430, filed Jun. 4, 2012, entitled "SETTING A REMINDER THAT IS TRIGGERED BY A TARGET USER DEVICE," which is a continuation-in-part of U.S. patent application Ser. No. 13/113,856, filed on May 23, 2011, entitled, IDENTIFYING AND LOCATING USERS ON A MOBILE NETWORK, now issued as U.S. Pat. No. 8,971,924, on Mar. 3, 2013, the entire contents of each of which are incorporated herein by reference.

BACKGROUND

1. Technical Field

The present disclosure relates to remotely communicating with a target mobile device such as a mobile telephone or a media player and more specifically, to setting a reminder that is triggered by the target mobile device and notifies a requesting device upon the reminder being triggered.

2. Introduction

Mobile devices have been adapted to a wide variety of applications, including computing, communication, and entertainment. Through recent improvements, mobile devices can now also determine their geographic location by either using a built-in global position system (GPS) antenna or extrapolating its location from the signals it receives through the network of fixed-location cellular antennas. Thus, a user may be able to use the mobile device to determine his or her location.

A mobile device user may wish to know the location of their family and friends. While several known systems perform such services, one drawback is that a mobile device user must repeatedly check the location status of their family and friends to know where they are or when they reach or leave a certain location. For example, a mother wishing to know when her child has arrived at school must repeatedly check the child's location status to see whether the child has arrived at school. As a result, a mother has to waste time constantly checking the location status of the child to determine if the child has arrived at school.

Similarly, a mother wishing to know if her child leaves school must constantly check their child's location status to see if the child is still at school. This can be excessively time consuming while also leaving open the possibility that the child will leave school unnoticed during a time in which the mother is too busy to check the location status of their child. Accordingly, what is needed is a way that a user can set a reminder that is triggered by a target user device and notifies the user when the reminder has been triggered.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for setting a reminder that is triggered by a target user device. A requesting user device can be configured to create a request that a reminder be set that is triggered by the target user device that, and upon being triggered, sends a notification to the requesting user device that the reminder has been triggered. The reminder can be associated with reminder parameters that dictate when the reminder is triggered. The parameters can include a location and a condition and the reminder can be triggered when the condition is met by the target user device in relation to the location. For example, the condition can be arrival and the reminder can be triggered upon a determination that the target device arrives at the location.

Once the request has been created, it can be sent to a server which determines whether the requesting device has permission to set a reminder on the target device. If the requesting device does have permission, the server can be configured to transmit instructions to the target device to set the reminder based on the parameters. The target device can be configured to check the location status of the target device to determine whether the condition has been met in relation to the location. Alternatively, the reminder can be set on the server which can be configured to check the status of the target device to determine whether the condition has been met in relation to the location.

In some embodiments, a geo-fence can be set around either the target device or the location. The geo-fence can be used to gauge the position of the target device in relation to the location. For example, the target device can be determined to be at the location if the location is within the geo-fence set around the target user device. In some embodiments, the requesting user can dictate the size of the geo-fence when requesting to set the reminder triggered by the target user device.

Upon a determination that the reminder has been triggered, the target user device can be configured to send a message to the server notifying the requesting user that the reminder has been triggered. The server can then send a notification, such as a push notification, to the requesting user device that the reminder has been triggered. The notification can state that the condition has been met in relation to the location.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
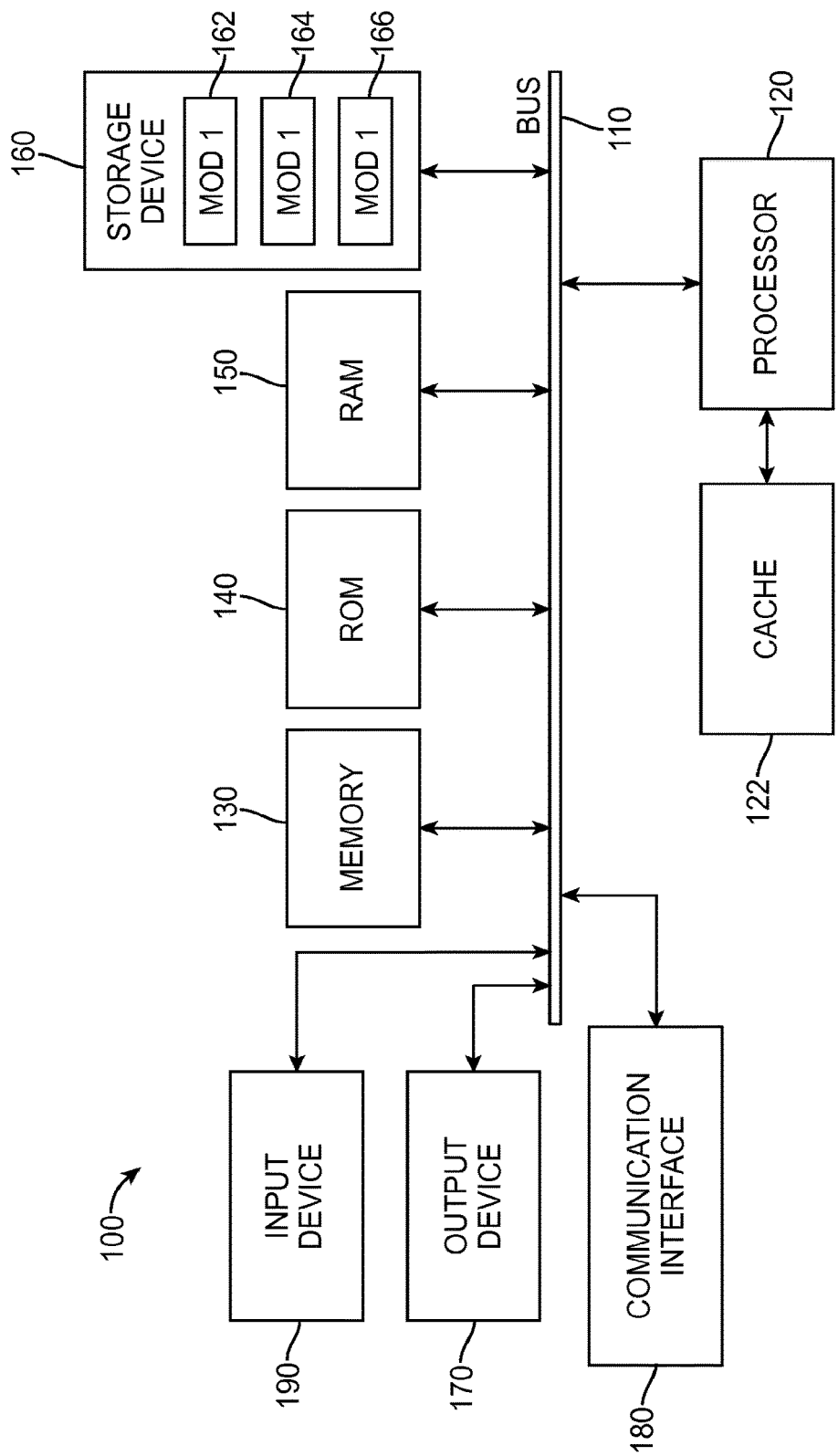
FIG. 1 illustrates an example system embodiment.

This disclosure begins with a brief introductory description of a basic general purpose system or computing device, as illustrated in FIG. 1, which can be employed to practice the concepts disclosed herein. A more detailed description of the methods and systems will then follow.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, output device 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs a storage device 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
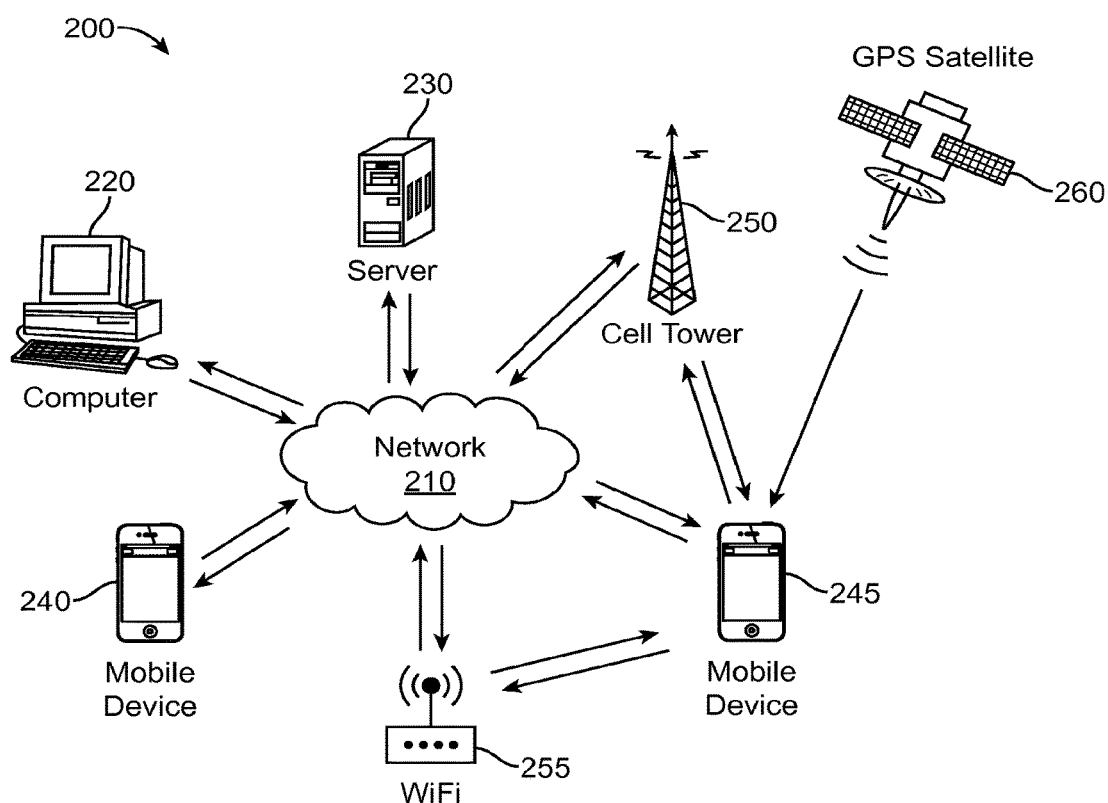
FIG. 2 illustrates an exemplary computing environment.

Having disclosed some components of a computing system, the disclosure now turns to FIG. 2, which illustrates a general purpose mobile computing environment 200. A communication network 210 connects the devices and applications hosted in the computing environment 200. In this computing environment 200, different devices may communicate with and send commands to each other in various ways. The server 230, for example, may function as an intermediary between two or more user devices such as, computer 220, mobile device 240, and mobile device 245. The server 230 may pass messages sent from one user device to another. For example, the server 230 may receive a request from device 240 (the "requesting device") to locate another device 245 (the "requested device"). In response to such a request (preferably after appropriate authentication and authorization steps have been taken to ensure the request is authorized by the user of the requested device), the server 230 may send a request to the requested device 245 and receive a response containing information relating to its location. The requested device 245 may have obtained this location information based on signals it received from, for example, GPS satellites 260. Having received a response, the server 230 may then send the information to the requesting device 240. Alternatively, the server 230 does not send a request to the requested device 245 because it has recent location information relating to the requested device 245 cached. In such an embodiment, the server 230 may respond to a request by sending cached location information to the requesting device 240 without communicating with the requested device 245.

The devices 220, 240, and 245 preferably have one or more location aware applications that may run on them. Of these applications, some may have the functionality to send requests to other user devices to enable a requesting user to locate a friend's device. Upon receiving authorization to locate, a requesting device may then be able to send location requests to requested devices and receive responses containing the location of the requested device. Authorization is preferably managed at the server level, but may also be managed at the device level in addition or as an alternative.

Referring back to FIG. 2, the communication network 210 can be any type of network, including a local area network ("LAN"), such as an intranet, a wide area network ("WAN"), such as the internet, or any combination thereof. Further, the communication network 210 can be a public network, a private network, or a combination thereof. The communication network can also be implemented using any type or types of physical media, including wired communication paths and wireless communication paths associated with one or more service providers. Additionally, the communication network 210 can be configured to support the transmission of messages formatted using a variety of protocols.

A device such as a user station 220 may also be configured to operate in the computing environment 200. The user station 220 can be any general purpose computing device that can be configured to communicate with a web-enabled application, such as through a web browser. For example, the user station 220 can be a personal computing device such as a desktop or workstation, or a portable computing device, such as a laptop a smart phone, or a post-pc device. The user station 220 can include some or all of the features, components, and peripherals of computing device 100 of FIG. 1.

User station 220 can further include a network connection to the communication network 210. The network connection can be implemented through a wired or wireless interface, and can support bi-directional communication between the user station 220 and one or more other computing devices over the communication network 210. Also, the user station 220 may include an interface application, such as a web browser or custom application, for communicating with a web-enabled application.

An application server 230 can also be configured to operate in the computing environment 200. The application server 230 can be any computing device that can be configured to host one or more applications. For example, the application server 230 can be a server, a workstation, or a personal computer. In some implementations, the application server 230 can be configured as a collection of computing devices, e.g., servers, sited in one or more locations. The application server 230 can include some or all of the features, components, and peripherals of computing device 100 of FIG. 1.

The application server 230 can also include a network connection to the communication network 210. The network connection can be implemented through a wired or wireless interface, and can support bi-directional communication between the application server 230 and one or more other computing devices over the communication network 210. Further, the application server 230 can be configured to host one or more applications. For example, the application server 230 can be configured to host a remote management application that facilitates communication with one or more mobile devices connected with the network 210. The mobile devices 240, 245 and the application server 230 can operate within a remote management framework to execute remote management functions. The application server 230 can be configured to host a notification service application configured to support bi-directional communication over the network 210 between multiple communication devices included in the computing system 200. For example, the notification service application can permit a variety of messages to be transmitted and received by multiple computing devices.

In some implementations, the notification service can include a defined namespace, in which a unique command collection topic can be created for each subscribing mobile device. A unique identifier can be used to associate a subscribing mobile device with the corresponding command collection topic, such as an assigned number or address. The unique identifier also can be embedded in a Uniform Resource Identifier (URI) that is associated with a subscribed command collection topic. Further, one or more command nodes can be created below a command collection topic, such that each command node corresponds to a particular remote command type. For example, a command collection topic can include a separate command node for a location command.

Through the use of separate command nodes, multiple commands can be transmitted to one or more mobile devices substantially simultaneously. In some implementations, if multiple commands are received in a command collection topic, server time stamps can be compared to determine an order of execution.

Through the notification service, a publisher, such as a remote management application, can publish a remote command message to a command collection topic that is associated with a particular mobile device. When a remote command message is published to the command collection topic, a notification message can be transmitted to the one or more subscribing mobile devices. The mobile device can then access the subscribed topic and retrieve one or more published messages. This communication between the publisher and the mobile device can be decoupled. Further, the remote command message can be published to the appropriate command node of the command collection topic. Additionally, a mobile device receiving a remote command message can publish a response to a result topic hosted by a notification service. A publisher such as a remote management application, can subscribe to the result topic and can receive any published response messages.

Further, the computing environment 200 can include one or more mobile devices, such as mobile device 240 and mobile device 245. These mobile devices are preferably smart phones such as an Apple iPhone® or post-pc device such as an Apple iPad®. Each of the mobile devices included in the computing environment 200 can include a network interface configured to establish a connection to the communication network 210. For example, mobile device 240 can establish a cellular (e.g., GSM, EDGE, 3G, or 4G) network connection that provides data access to the communication network 210. Such a connection may be facilitated by one or more cellular towers 250 located within the range of the mobile devices 240 and 245 and connected to the network 210. Further, mobile device 245 can establish an IEEE 802.11 (i.e., WiFi or WLAN) network connection to the communication network 210. Such a connection may be facilitated by one or more wireless network routers 255 located within the range of the mobile devices 240 and 245 and connected to the network 210. Also, either one of these mobile devices 240, 245 or an additional device may connect to the network 210 through the IEEE 802.16 (i.e., wireless broadband or WiBB) standard. Again, the devices 240, 245 may employ the assistance of a cell tower 250 or wireless router 255 to connect to the communication network 210.

Each of the mobile devices, 240 and 245 also can be configured to communicate with the notification service application hosted by the application server 230 to publish and receive messages. Further, each of the mobile devices 240 and 245 can be configured to execute a remote management application or a remote management function responsive to a remote command received through the notification service application. In some embodiments, the remote management application can be integrated with the operating system of the mobile device.

A mobile device can execute a remote command to perform one or more associated functions. For example the remote commands can include locate commands, notification commands, and message commands. A message command can be used to present a text-based message on the display of a mobile device. A locate command can be used to cause a mobile device to transmit a message indicating its location at the time the locate command is executed. The locate command may also command the mobile device to use certain resources, such as an embedded GPS system, to determine its location.

Additionally, each of the mobile devices 240 and 245 can include an input interface, through which one or more inputs can be received. For example, the input interface can include one or more of a keyboard, a mouse, as joystick, a trackball, a touch pad, a keypad, a touch screen, a scroll wheel, general and special purpose buttons, a stylus, a video camera, and a microphone. Each of the mobile devices 240 and 245 can also include an output interface through which output can be presented, including one or more displays, one or more speakers, and a haptic interface. Further, a location interface, such as a Global Positioning System (GPS) processor, also can be included in one or more of the mobile devices 240 and 245 to receive and process signals sent from GPS satellites 260 for obtaining location information, e.g., an indication of current location. In some implementations, general or special purpose processors included in one or more of the mobile devices 240 and 245 can be configured to perform location estimation, such as through base station triangulation or through recognizing stationary geographic objects through a video interface.

Figure 3A:
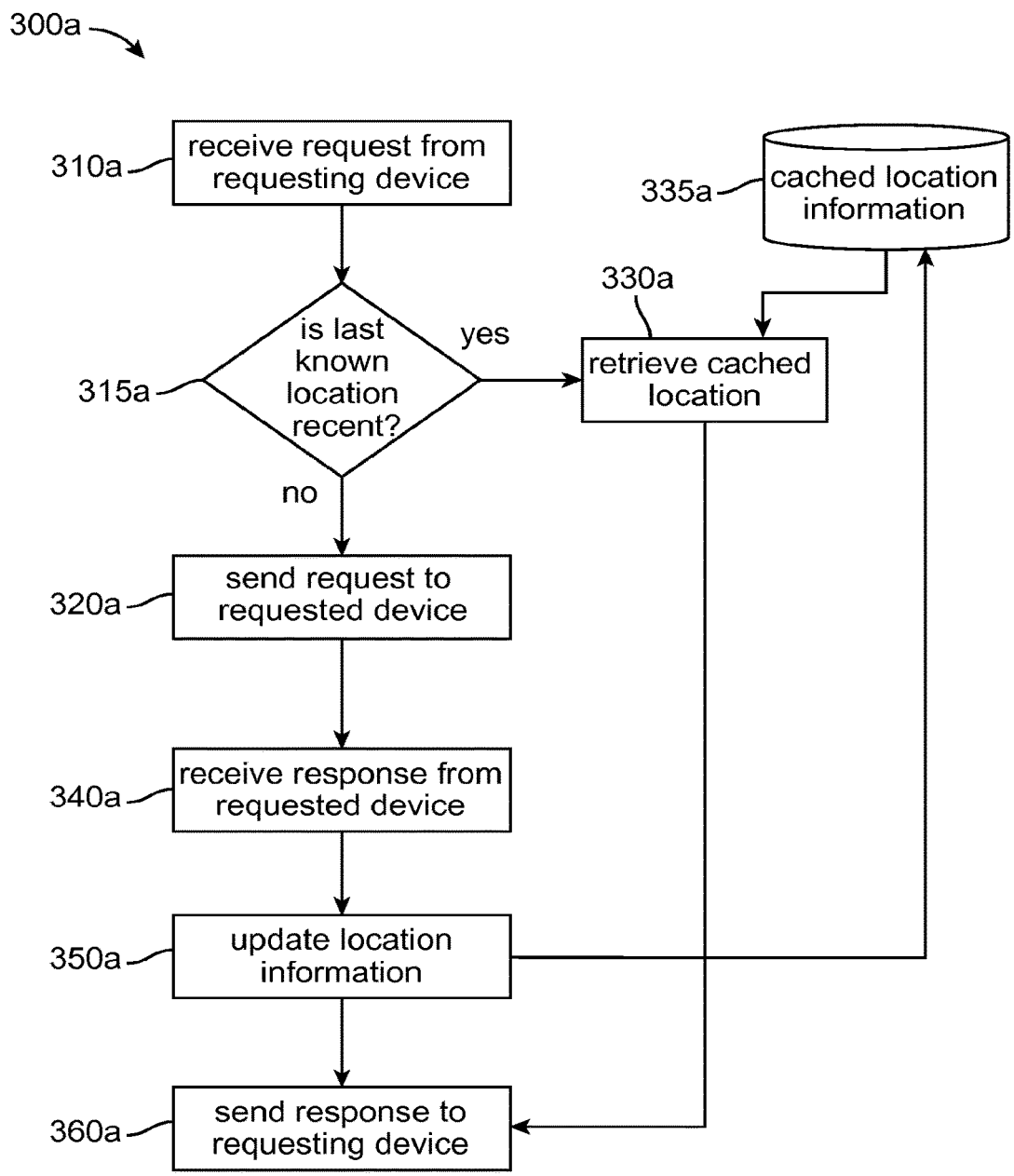
FIGS. 3*a* and 3*b* illustrate flow diagrams describing exemplary processes for locating a mobile device.
Figure 3B:
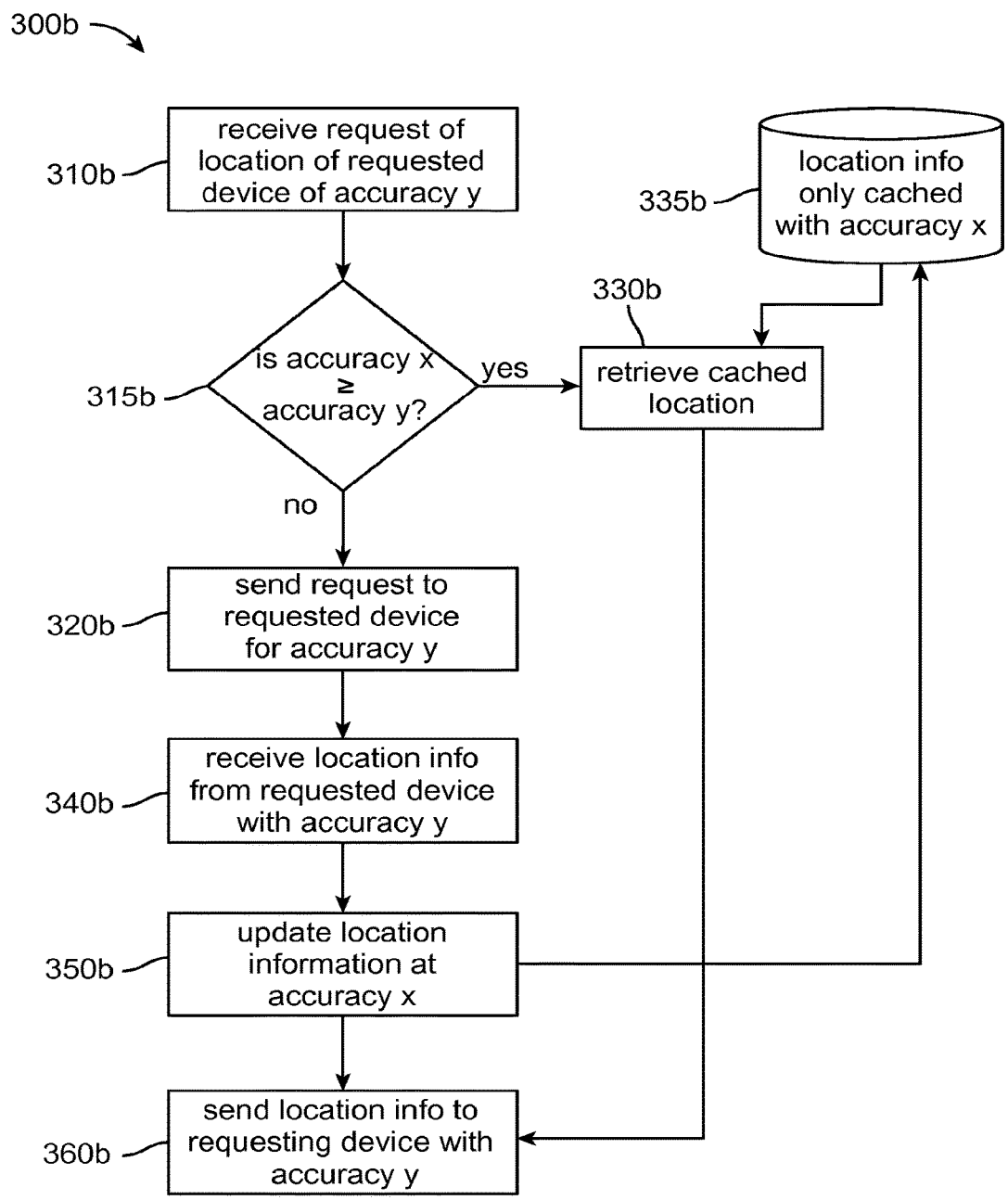

Having disclosed some basic system components and concepts, the disclosure now turns to exemplary method embodiments 300a and 300b shown in FIGS. 3a and 3b respectively. For the sake of clarity, the methods are discussed in terms of an exemplary system 100 as shown in FIG. 1 configured to practice the methods and operating environment shown in FIG. 2. The steps outlined herein are exemplary and can be implemented in any combination thereof, including combinations that exclude, add, or modify certain steps.

FIG. 3a shows a flow diagram illustrating an exemplary process executed by a server for servicing a request by a requesting device to locate one or more mobile devices (requested devices), such as mobile devices 240 and 245 in FIG. 2, connected to a communication network, such as communication network 210 in FIG. 2. The process may be performed by a server such as application server 230 in FIG. 2.

In a preferred embodiment, the server 230 may maintain data associated with the members of one or more services. The maintained data may include certain identification information relating to each member such as, for example, the member's username and other personal identification information, unique identification information relating to the member's phone, and the identification of other members that have chosen to give permission to share their location information with this member. The information may also include recent location information of each member. This location information may be caused to be updated by certain applications/processes on the member's mobile device and/or at the request of a requesting device. For example, an application on a mobile device such as a mapping service or other location aware application may be requested by the user to determine the location of the device and, whenever such a determination is made, the device may provide this information to the application server. The server may then retain this information in storage 335a for a length of time that has been deemed to still be representative of that device's location (such as, for example, 15 minutes or less).

In a preferred embodiment, a user/requester may have an application on his or her computer or mobile device that, when executed, initiates one or more locate requests to all of the devices whose members have agreed to share their location with the requester (the requestor's "friends"). In such embodiments, the application may initially present to the user/requester the location of all of the friends on a map or in a list. The locate request 310a may be received by a server such as application server 210 in FIG. 2 for processing.

Upon receiving a location request from a mobile device 301a of a requesting user, the server may initially respond with the location data that it has cached in 335a. As mentioned above, in a preferred embodiment, the application server may maintain and/or cache information relating to members of services including recent location information. Updates in location information preferably overwrite older location information. Thus, the server may first, in step 315a, determine whether it is in possession of recent location information. As mentioned before, the server may have a set "time of life" for the location information it maintains. When it has decided that the location information is has is recent, in step 330a, the server retrieves the last known location from storage 335a. Again, in some instances such as when a person may be on the go, only very recent location information would be relevant. Thus, some embodiments, the time of life of the information may be adjusted based on the device's recent location activity. Some examples might include when the owner of the device has designated his/her location, such as home or work, where he/she typically remains for several hours at a time each day. Thus, if the server determines that it is in possession of location information of the requested mobile device deemed to be recent, it will provide that information to the requesting device in step 360a.

The server also preferably maintains this location information at a relatively low level of accuracy. The reason for this is similar to why the location is only deemed relevant for a short period of time: the more accurate the location information is, the more likely the person has since moved from that specific location, thereby rendering the location incorrect. Thus, maintaining recent location information at a lower level of accuracy increases the likelihood that the location is still correct and, therefore, not requiring additional communication with the user device.

Alternatively, the server may determine, in step 315a, that it does not have recent location information relating to the requested device. The server may, in step 320a, send a location request to the one or more requested devices (i.e., those devices associated with the friends). In this step, the server transmits a location request message to each requested device. The message sent by the server may take on any number of forms but has the effect of commanding the requested mobile device to obtain its current location information and transmit it back to the server in the form of a response message. In some alternative embodiments, the server only sends a location request message to the cellular network system, which may continually maintain recent location information relating to the requested device. Such location information may include, for example, the coordinates of the cell sites deemed closest to the requested device.

Some time after sending the request in step 320a, server receives responses in step 340a. Depending on, for example, the location of the requested devices and the network traffic, the responses may arrive in any order and may take different amounts of time. The response messages from the devices preferably include information relating to the location of the responding device and the time at which the location was determined.

This location information may be determined by the device in any number of ways including but not limited to those that have been discussed above. This information may even be obtained indirectly (i.e., not directly from the requested device), such as from the cellular communications network to which the device is communicating. For example, obtaining location information from the cell tower identified as being closest to the mobile device. Although this option may be of lower accuracy, it oftentimes may result in a quicker response and a savings in battery life for the requested device. Accordingly, the level of accuracy of the location information may vary. Thus, the location information may therefore include accuracy information as well.

In some embodiments, the owner of the responding device may have the option to enter unique location identifiers or labels associated with a location. For example, a user may assign labels such as "home," "work," or "school" to such locations. The user's mobile device may preferably associate certain geographic coordinates with such a label and transmit location-based messages to the server including the associated label.

Upon receiving this information, in step 350a, the server preferably updates the stored information 335a, if any, that it maintains relating to the device's last known location so that it may be made available to the next requester.

Having received a response from a requested device, in step 360a, the server may then send location information to the requesting device. This step may be performed for each response received by the server from the various requested devices. Although location information relating to some devices may have already been retrieved from cache 335a in step 330a, the server may additionally request and send updated information to the requesting device. In some embodiments, the server may additionally have a step (not shown) to compare the "known location information" that it had initially sent to the requesting device with the location information that it just received from the requested device to determine if sending the recently received location information would be any different. In other words, some embodiments would only send location information to the requesting device if the location of the requested device has changed. In such embodiments, a reduction in the amount of data that needs to be communicated may be realized.

In addition to temporal accuracy, the server may also have logic to determine how to handle a location request having a certain geographic location accuracy. FIG. 3b shows a flow diagram illustrating an exemplary process 300b executed by a server for servicing a request by a requesting device to locate one or more mobile devices within a certain level of accuracy.

In a preferred embodiment, in step 310b, the server receives a request to acquire location information relating to a requested device at a certain acceptable level of accuracy (accuracy y). In a preferred embodiment, the server typically only maintains, in storage 335b, location information relating to devices at one level of accuracy (accuracy x). After receiving the request, in step 315b, the server determines whether the accuracy of the location information it has in storage 335b is greater than or equal to the accuracy requested by the requesting device (i.e., accuracy x≥accuracy y). If so, the level of accuracy is deemed acceptable and, in step 330b, the server retrieves the stored location information and, in step 360b, sends the location information to the requested device.

More typically, however, when the server receives a request for location information of a requested device, the requested accuracy (accuracy y) is greater than the accuracy of the information stored in 335b (accuracy x) (i.e., accuracy y>accuracy x). When this is determined in step 315b, the server sends a request to the requested device in step 320b. This request may be in several different forms. For example, the server may simply transmit the contents of the request to the requested device, containing the requested accuracy information, and leave it to the requested device (through its hardware, operating system, and applications) to determine how to respond to the request. Alternatively, the server may have sufficient information relating to the capabilities of the requested device (such as it having a GPS antenna of a certain accuracy) and the message sent is simply a command to determine its location using its GPS antenna and send this information to the server. The server, in step 340b, then receives the location information from the requested device. Again, this information may be in several different forms and may depend on the device information known by the server. For example, the response may include accuracy information provided by the requested device or may simply include the location and the means by which it was obtained. In the latter form, the server, preferably knowing the model features of the requested device, may then determine the accuracy provided by the requested device. Also, depending on the request sent by the server, the means information may not be provided in the response but may be implied by the server as the same as what was requested. Once the location information is received by the server, in step 350b, it updates its stored location information, 335b, and sends location information to the requesting device in step 360b.

Generally, the location information that is handled is of a low accuracy, such as at a city level or within a few miles of accuracy. As mentioned above, such information may be obtained by the server indirectly by, for example, knowing the geographic location of the cell phone tower or ISP to which the requested device is communicating. It is generally understood that mobile phones communicating with a cellular communications network periodically seek out cell sites having the strongest signal. In many cases, the strongest signals are measured by those cells that are the shortest distance away. Thus, in an area where there is a cell-phone tower every 4 miles, for example, the location of the mobile device may be extrapolated to be within 2 miles of the closest cell tower. A more accurate method of determining the location of a mobile device may be by determining the time difference of arrival (TDOA). The TDOA technique works based on trilateration by measuring the time of arrival of a mobile station radio signal at three or more separate cell sites. Such a method may be based on the availability of certain equipment supplied by the cellular network which may not be universally available and is therefore only an alternative embodiment. In either case, the location/accuracy determination may be performed by the communications network rather than by the mobile device. Such low accuracy information may preferably be transmitted by the server to the requesting device initially to give the device user a quick read on where his or her friends are located. The actions associated with obtaining such low accuracy information is herein referred to as a "shallow locate."

Such low accuracy (i.e., less accuracy) location requests are only approximations but are preferably made initially, as they may result in the fastest response and require fewer resources from the requested device. On the other hand, a "deep locate request" may be requested by a user of a requesting device to obtain location information of a relatively higher accuracy (i.e., more accurate) from the requested device. For example, a "deep locate request" may command the requested device to use its GPS location resources to obtain location information having a level of accuracy that may be greater than that of some of the other location methods discussed above. While using a device feature such as GPS may be more accurate, the time and resources required to obtain signals from a sufficient number of GPS satellites and calculate the location oftentimes may take longer and require more energy. Thus, the "deep locate request" option is preferably reserved for specific requests made by the user of the requesting device.

Figure 4:
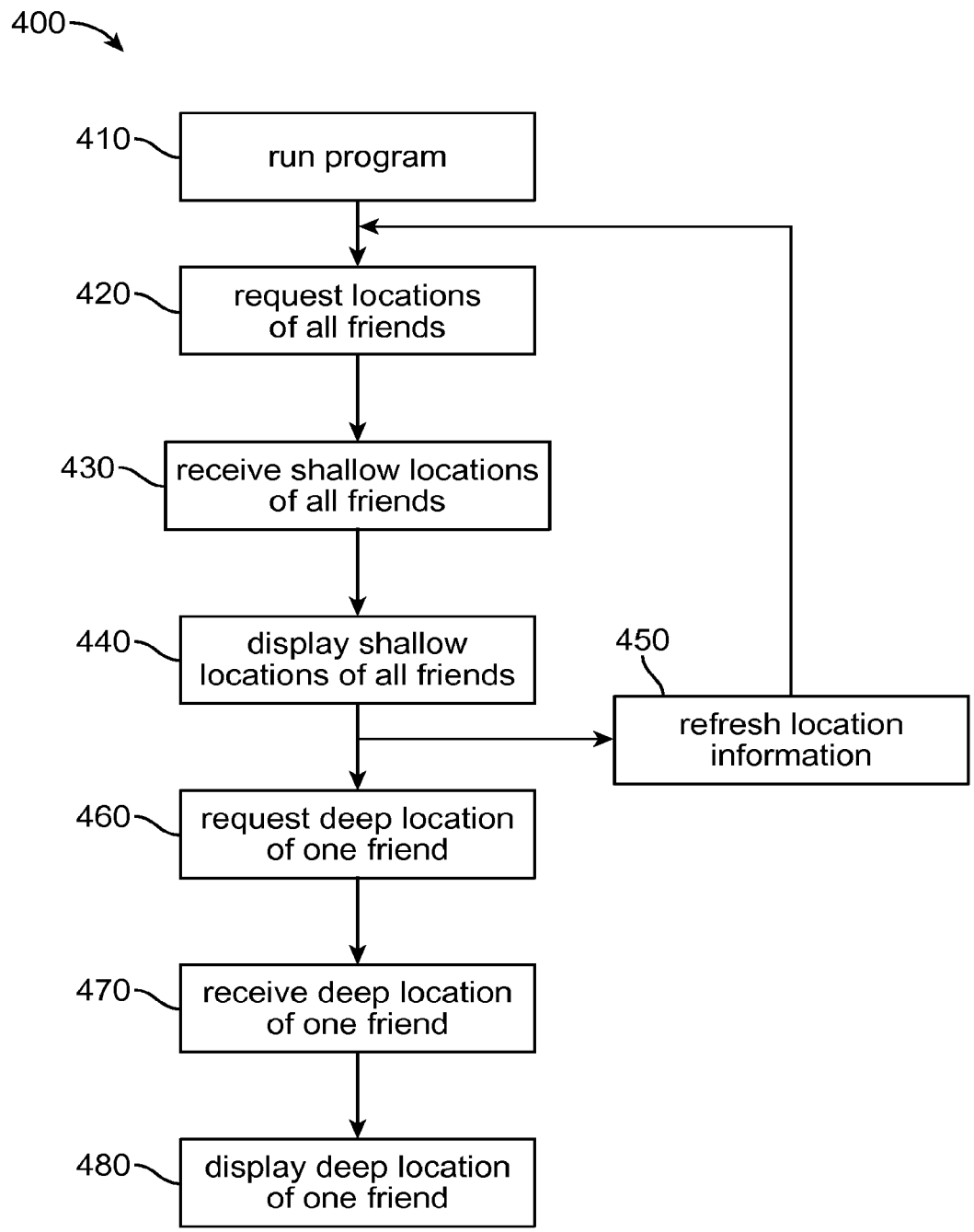
FIG. 4 illustrates a flow diagram describing an exemplary process for locating a mobile device and updating the location information.

This concept of a "shallow locate request" and a "deep locate request" is further illustrated from the perspective of the requesting device, such as a mobile device, in exemplary method 400 of FIG. 4. In a preferred embodiment, method 400 begins with step 410 when the application is started on a mobile device. Initially, in step 420, the device may request location information of all friends that are associated with the user. This initial request is preferably a "shallow locate request" that is sent out to all of the "friend" devices (i.e., devices whose owners have allowed the requester to obtain location information). This request is sent to the server where it may be passed onto the requested device or serviced by the server, or both, as discussed above. Requesting device may then, in step 430, receive responses containing the shallow locations of its user's friends. As the responses are received, requesting device may display the locations of the friends to the user in step 440.

As individuals are often on the go, it is of value to the requesting user to occasionally have the location information of friends updated from time to time. The updating or refreshing of location information, performed in step 450, may be done automatically at predetermined intervals, such as every 15 seconds or 15 minutes, and/or may be done at the request of the user. These predetermined timing intervals may be consistently applied to every user or may be individually applied to each user differently based on the individual user's observed moment frequency in combination with the heuristics of observed general user-movement data (e.g., determine a shorter time interval for a user observed to be traveling on a highway but determine a longer time interval for a user who has "checked-in" to a location such as a restaurant). As is shown in method 400, a refresh step 450 will operate to repeat a request for shallow location information of all of the user's friends.

In addition to requesting and obtaining shallow location information of all of the user's friends, the user may request and obtain more detailed or "deep" location information of one or more friends, beginning in step 460. To perform a "deep locate request," in a preferred embodiment the user may select a friend that has been presented to the user after a shallow locate request. In this preferred embodiment, a deep locate request is sent to the server which will send a command to the requested device to provide more detailed location information. This request may include commanding the device to obtain accurate location information from its GPS system. Upon the receipt of the response in step 470, the requesting device may display the deep location of the friend to the user in step 480. The accuracy of the deep location may also be displayed to the requesting user.

Figure 5:
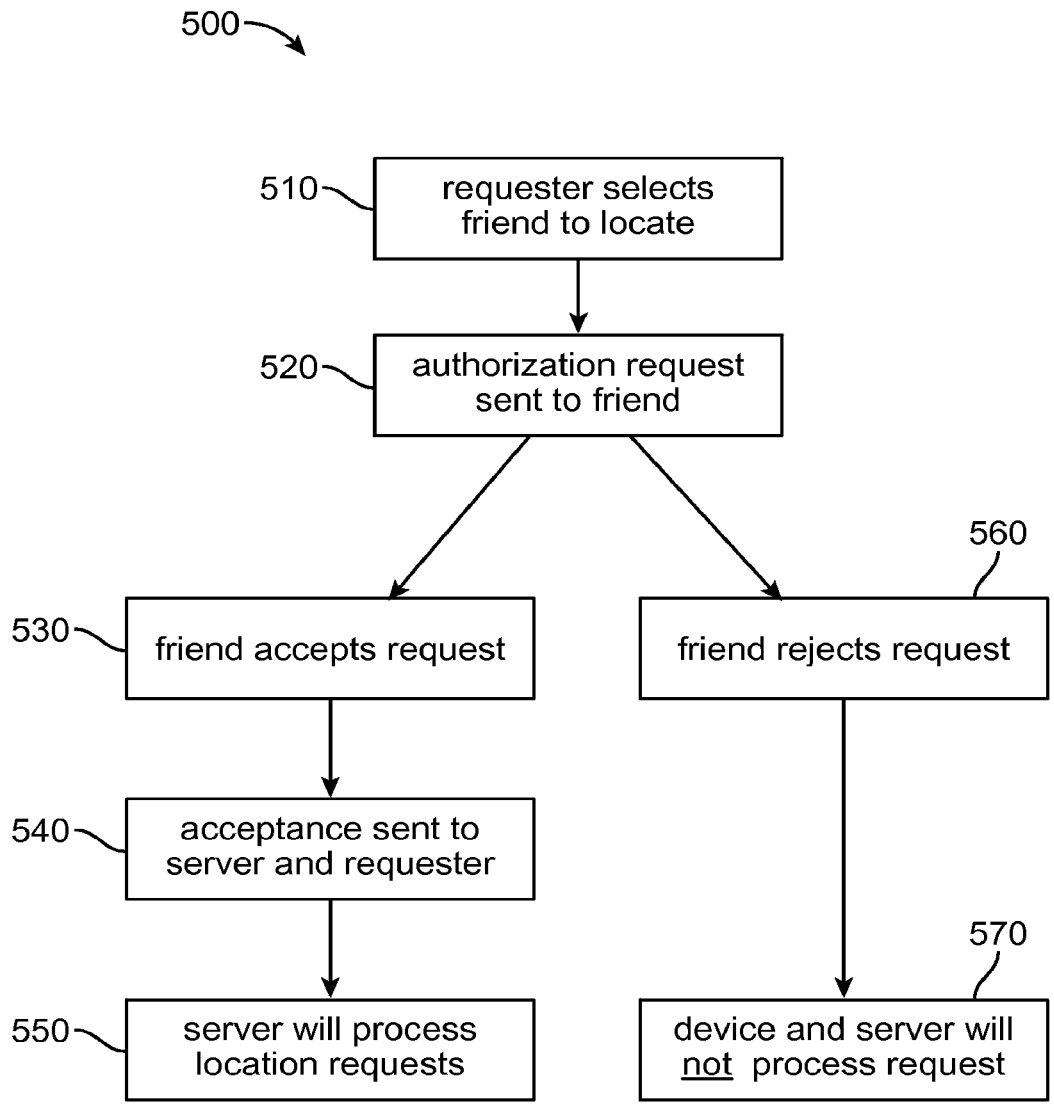
FIG. 5 illustrates a flow diagram describing an exemplary process for sending an invitation to a mobile device user to share location information.

One way a user may gain authorization to obtain location information of a device associated with a friend is shown by method 500 in FIG. 5. In most embodiments, in order for a user to be able to locate a friend, that user must send an authorization request to the friend. A user may do this by, in step 510, selecting a friend to request authorization. In a preferred embodiment, the locating application may refer to or rely upon other applications on the user's device to maintain information of the user's friends. One example may be an address book application that stores contact information of persons known by the device user. These persons may include, friends, family members, business contacts, and others whose contact information the user has obtained. In the case where the particular person is not in the user's address book, the user may be able to enter that person's contact information directly into the running application. Upon selecting/entering a contact to locate, in step 520, an authorization request is prepared and sent from the user's device.

Upon receiving a request from a user, the requested person (i.e., "friend") is preferably presented with a message explaining the nature of the request and where he or she may either accept the request or reject the request. When the friend accepts the request in step 530, an acceptance response is sent from that friend's device in step 540. Upon receiving an accepting response, the server may update the information it maintains on either or both the requesting user and accepting friend such that when the user sends a location request, the server will process that request in step 550. In addition, a notice may be sent by the server back to the requesting user to indicate to the user and/or the user's device that the authorization request has been accepted. Accordingly, the user may now obtain location information relating to that friend. In a preferred embodiment, the friend may revoke the authorization given to the user at any time; thus, the friend maintains control over the privacy of his or her location information.

On the other hand, a friend who has received a request to authorize the user to locate him or her but has rejected or ignored the request in step 560 may not be able to obtain location information relating to that friend. Thus, if the user subsequently attempts to locate that friend, in step 570, both the device and the server will not process that request. From the requesting user and device perspective, such a friend would be displayed as having a status of "awaiting a response," location not available," or simply will not be listed. Of course, in some embodiments, the user may be able to send another request to the friend subsequently.

FIGS. 6-20 show a series of "screen shots" of preferred embodiments of the present disclosure as they might be viewed on a mobile device, such as the iPhone® or iPad®, both by Apple, Inc. One skilled in the art will appreciate that while the preferred embodiments are shown on these particular Apple products, the location application may be employed on any type of mobile device, smart phone, post-pc device, laptop computer, or desktop computer.

Figure 6:
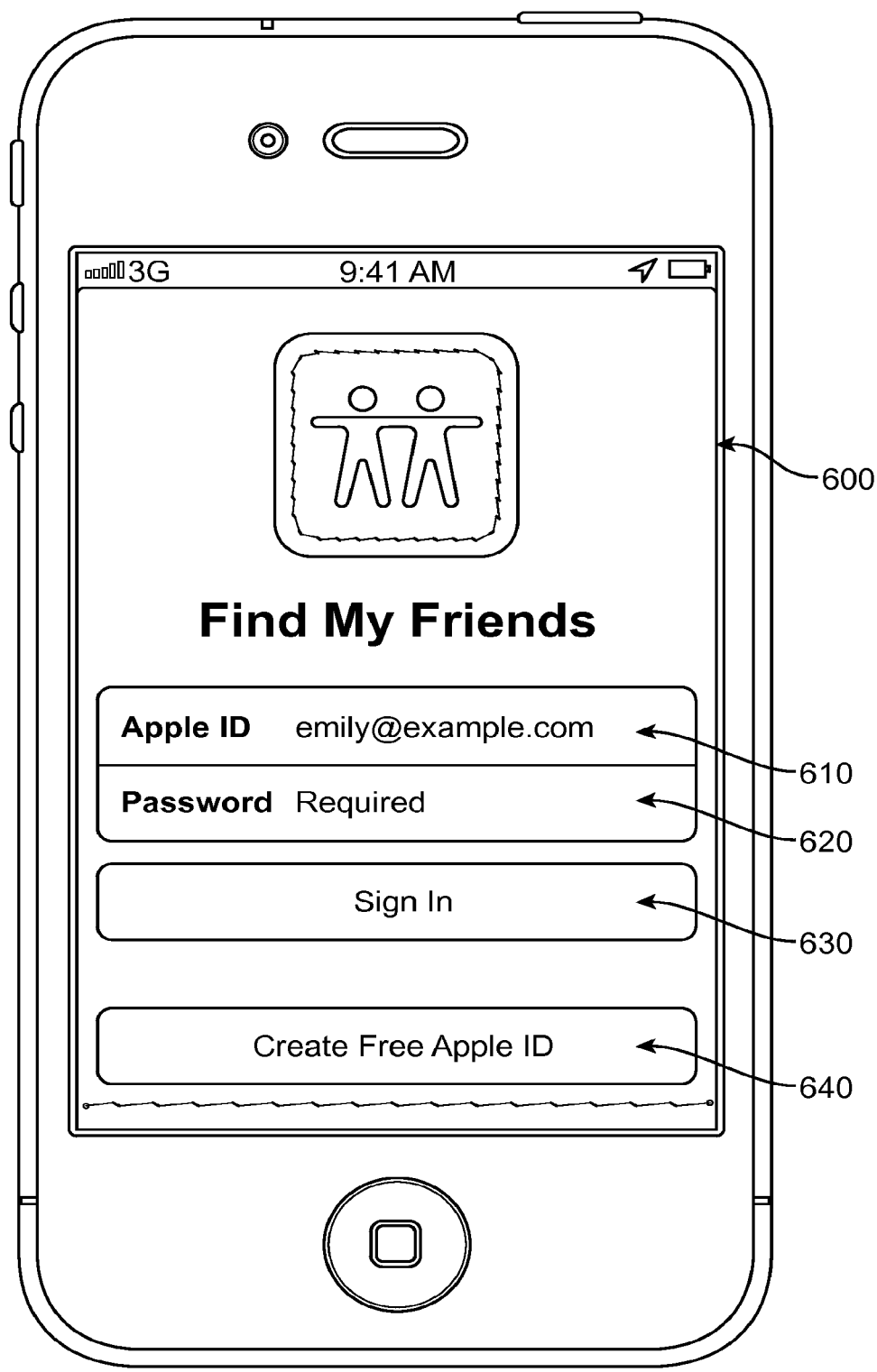
FIGS. 6-12 illustrate exemplary user interfaces depicting how a user may locate friends.

FIG. 6 illustrates an interface window 600 that is presented to a user when he or she initially runs the location program. In this window, the user may be prompted to enter his or her user ID 610 and password 620 associated with an account that the user has presumably already established with the location service. After entering a user ID and password, the user may select the "sign in" button 630 to authenticate and run the program. If the user has not yet created an account, the user may do so by selecting button 640.

Figure 7:
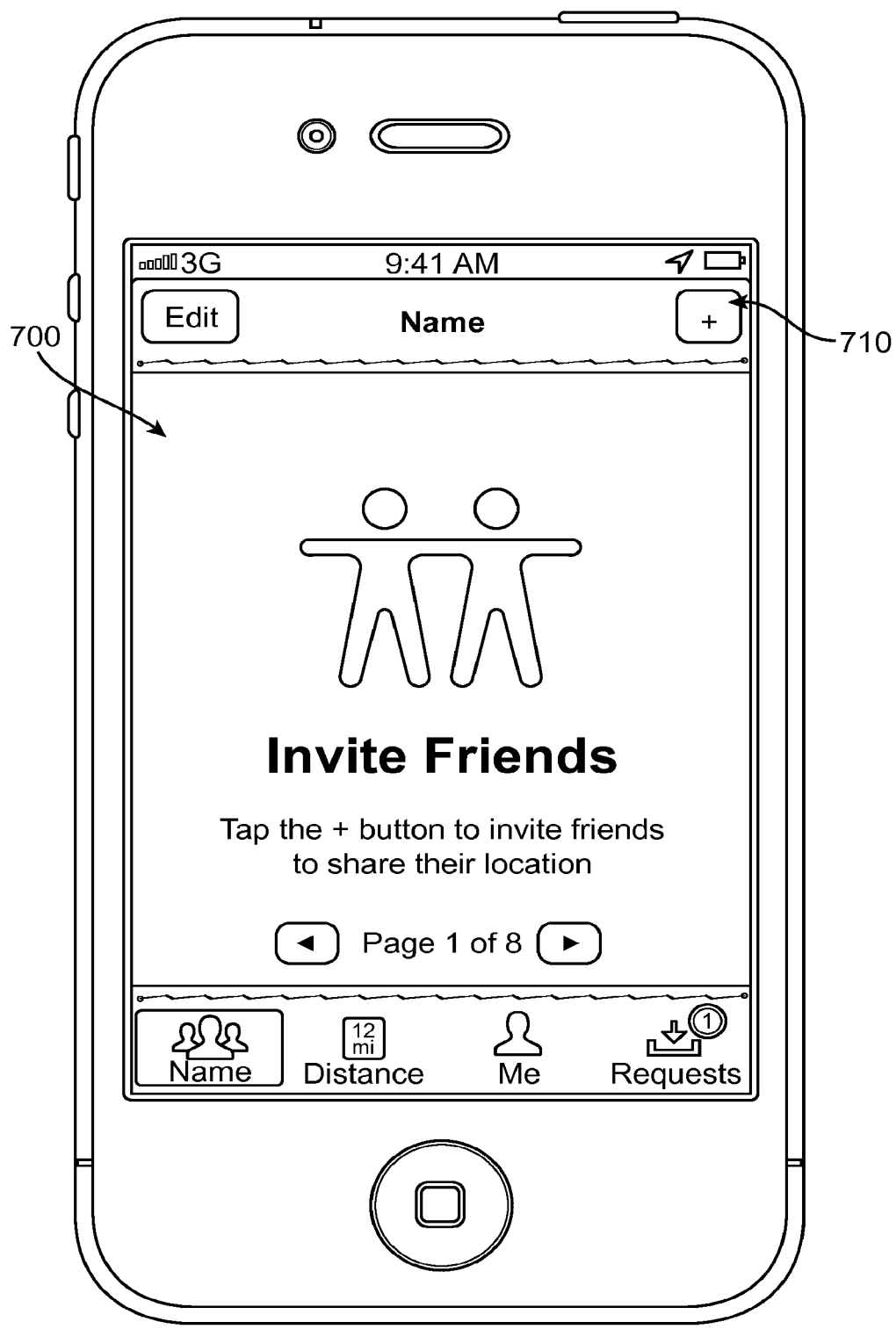

As shown in FIG. 7, when the user logs in for the first time, he may be presented with a screen 700 prompting him or her to invite friends to share their location. To invite a friend to share their location, a user may tap on the "+" button 710 to open a screen to select friends to invite. A more detailed explanation of these actions is in the discussion associated with FIGS. 11-16 below.

Figure 8:
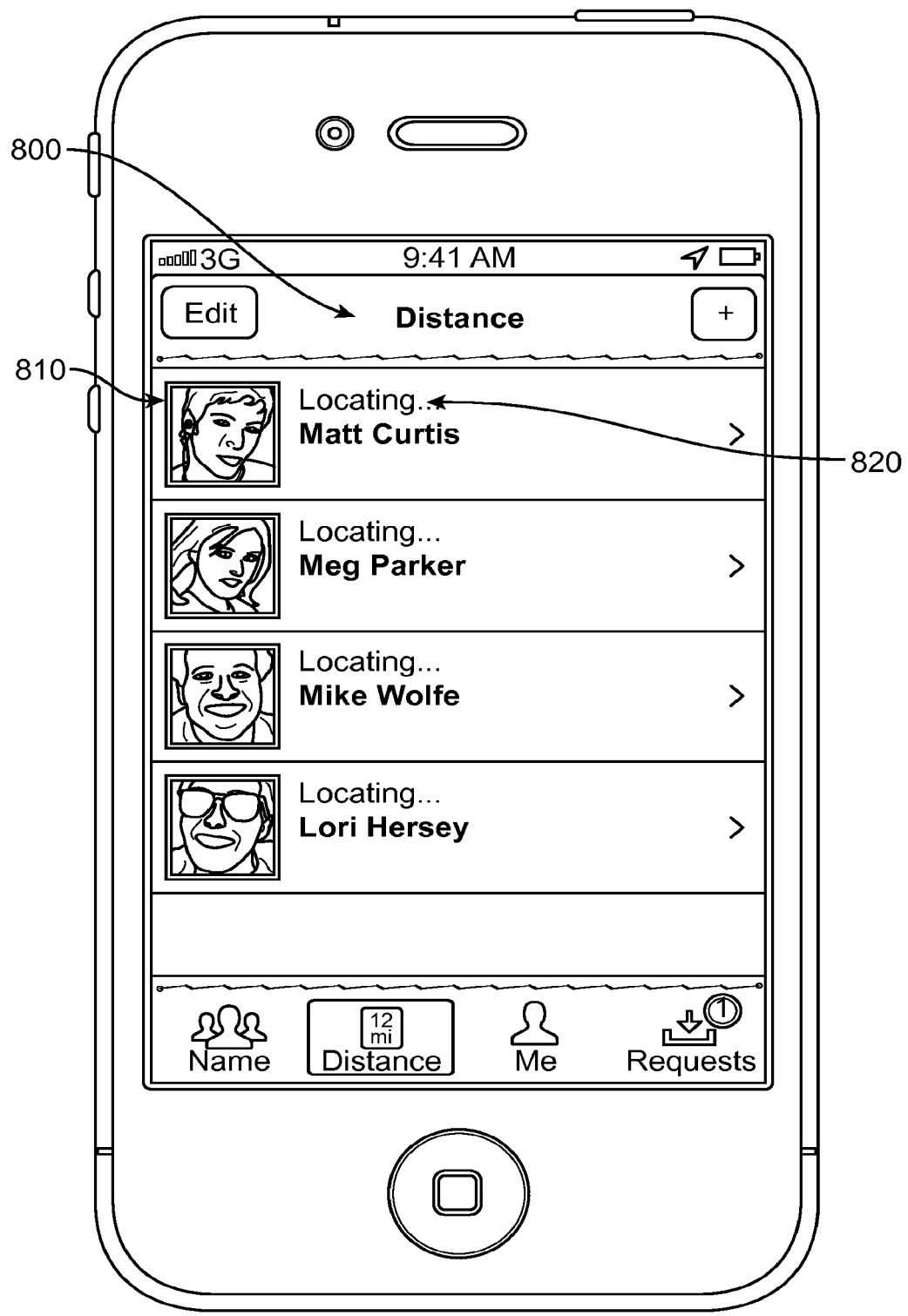

On the other hand, FIG. 8 shows what a user may likely immediately see when logging in after having several friends accept the user's invitation to share their location. As shown in FIG. 8, a list of friends 800 is displayed to the user. Next to a displayed friend's information 810 is a locating status indicator 820. In this case, the status is that the device has sent out location requests to all of the friends' devices and is still waiting for responses from each of the devices.

Figure 9:
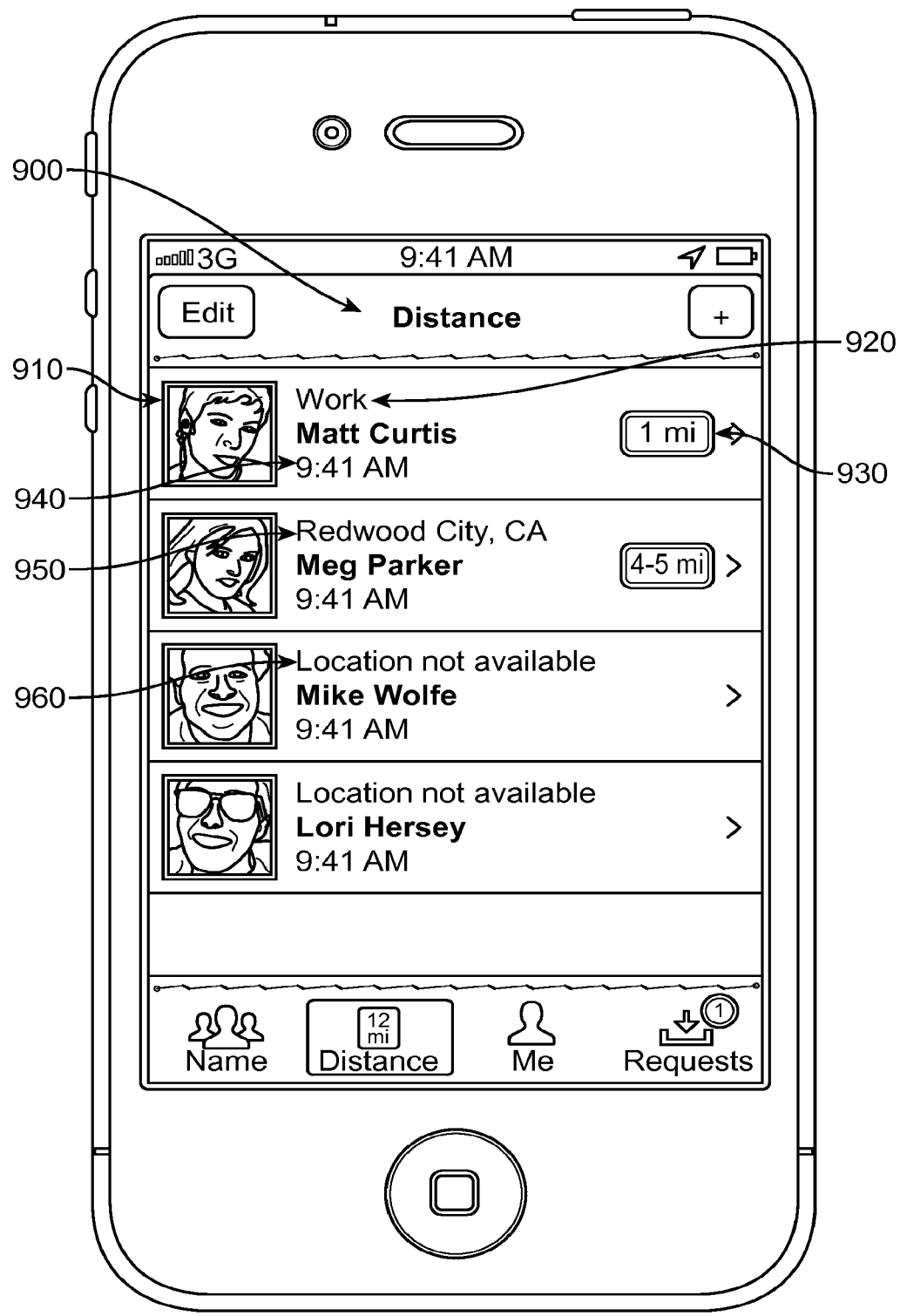

After a brief time has elapsed and the device has received location information relating to the user's friends, the location information may be presented to the user in display interface 900, as shown in FIG. 9. As can be seen in FIG. 9, the friend information 910 may now include the location of the friend 920, the accuracy of the location information 930, and the time at which the location information was obtained 940. The location 920 may be presented in a number of ways. For example, location information 920 includes a label that was selected by the user. Alternatively, the location information may include the name of the town or an address at which the friend is located, as in 950. Additionally, when a location request was not successful, the display 900 may present a message similar to that of 960.

Figure 10:
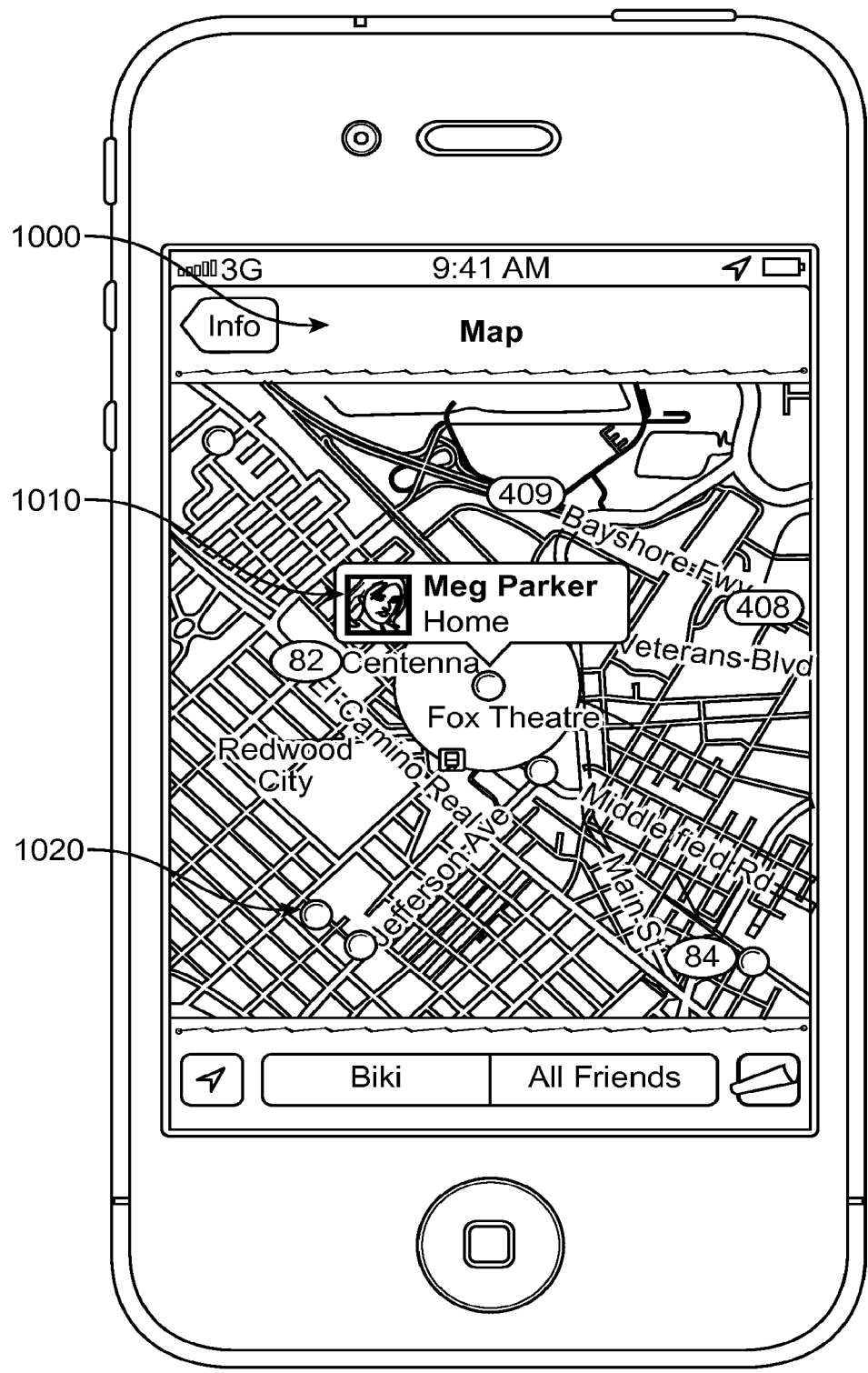

FIG. 10 shows an alternative embodiment of displaying location information of friends. As is shown in FIG. 10, map interface 1000 is presented. In a preferred embodiment, the initial scale of map interface 1000 may be determined by the identified locations of each of the user's friends such that all of the user's friends may be viewed on one screen. Thus, if all of the user's friends are located within a few miles from each other, the scale of map interface 1000 may be zoomed in such that only a few miles (i.e., a city level) are presented. On the other hand, if the user's friends are located across the country or in other countries, the scale of the map may be zoomed out such that map interface 1000 is covering hundreds or even thousands of miles (i.e., a state level).

Referring again to FIG. 10, the user is presented with locations of his or her friends on map 1000. In a preferred embodiment, the locations of the friends are presented as dots 1010 and 1020. However, any other icon or other reasonable method of indicating the location of a person on an interactive map may be used. When the user selects one of the dots, information relating to the friend at that location appears, as is shown in dot 1010. Additionally, the accuracy information may also be graphically presented on the map in the form of a shaded circle surrounding the friend's dot with a radius equivalent to the level of accuracy provided, as is shown in dot 1010.

Figure 11:
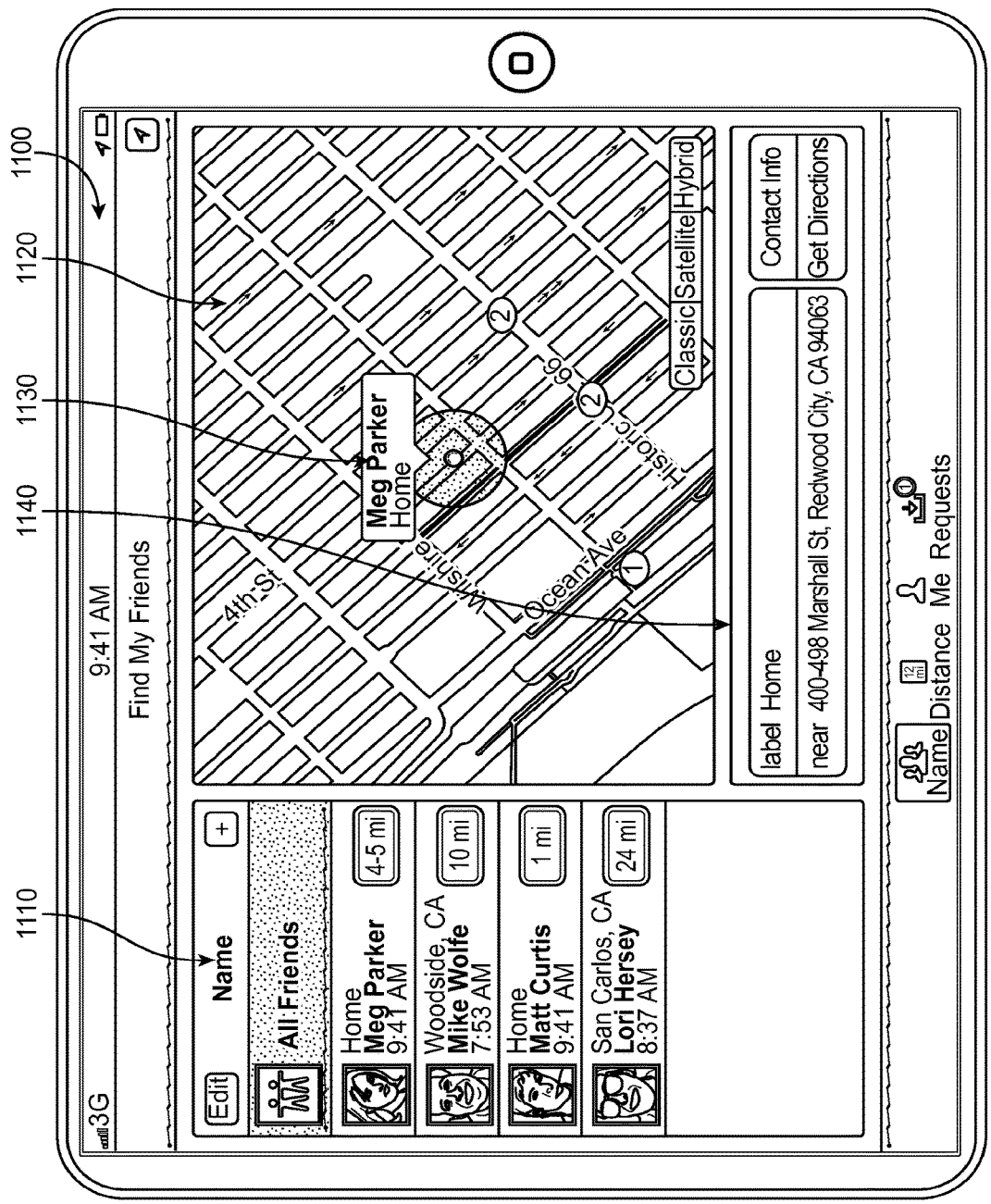
Figure 12:
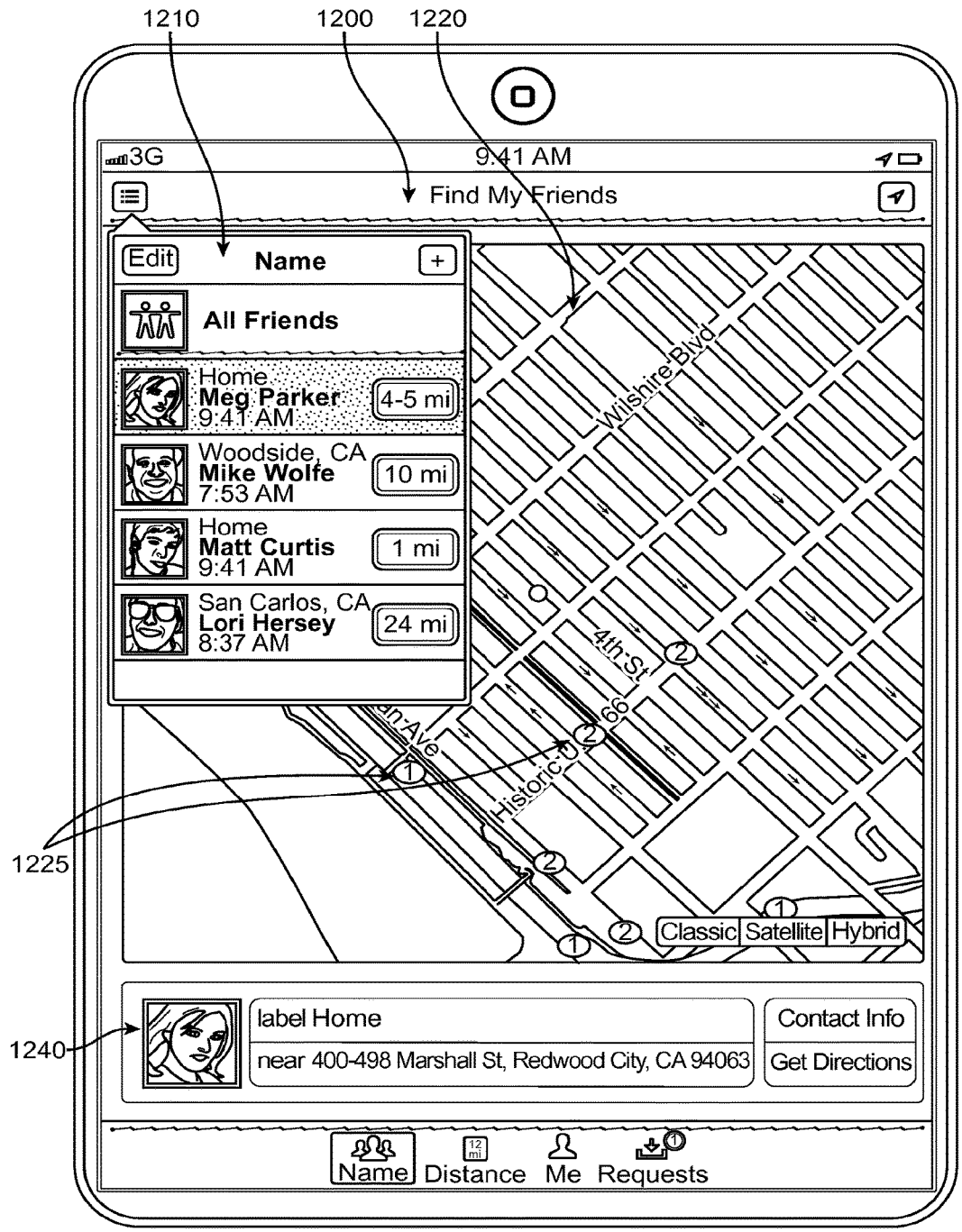

FIGS. 11 and 12 show alternative embodiments of the present invention. Such embodiments may be ideal for use on a device that has a larger screen, such as an iPad, laptop, or desktop computer. In FIG. 11, interface 1100 displays both a listing of the user friends in a table format 1100 as well as their geographic location on a map 1120. In interface 1100, when a user selects one of his or her friends 1130 on the map 1120, details relating to the location of the friend may appear at the bottom of the map 1140. Similarly, in FIG. 12, which provides an interface in a different aspect ratio, interface 1200 presents to the user a map 1220 indicating the geographic locations of his or her friends 1225. Overlaying the map is a list of the user's friends in table 1210. Similar to interface 1100, when the user selects one of his or her friends within table 1210, details of that friend may be displayed at the bottom of the display 1240.

Figure 13:
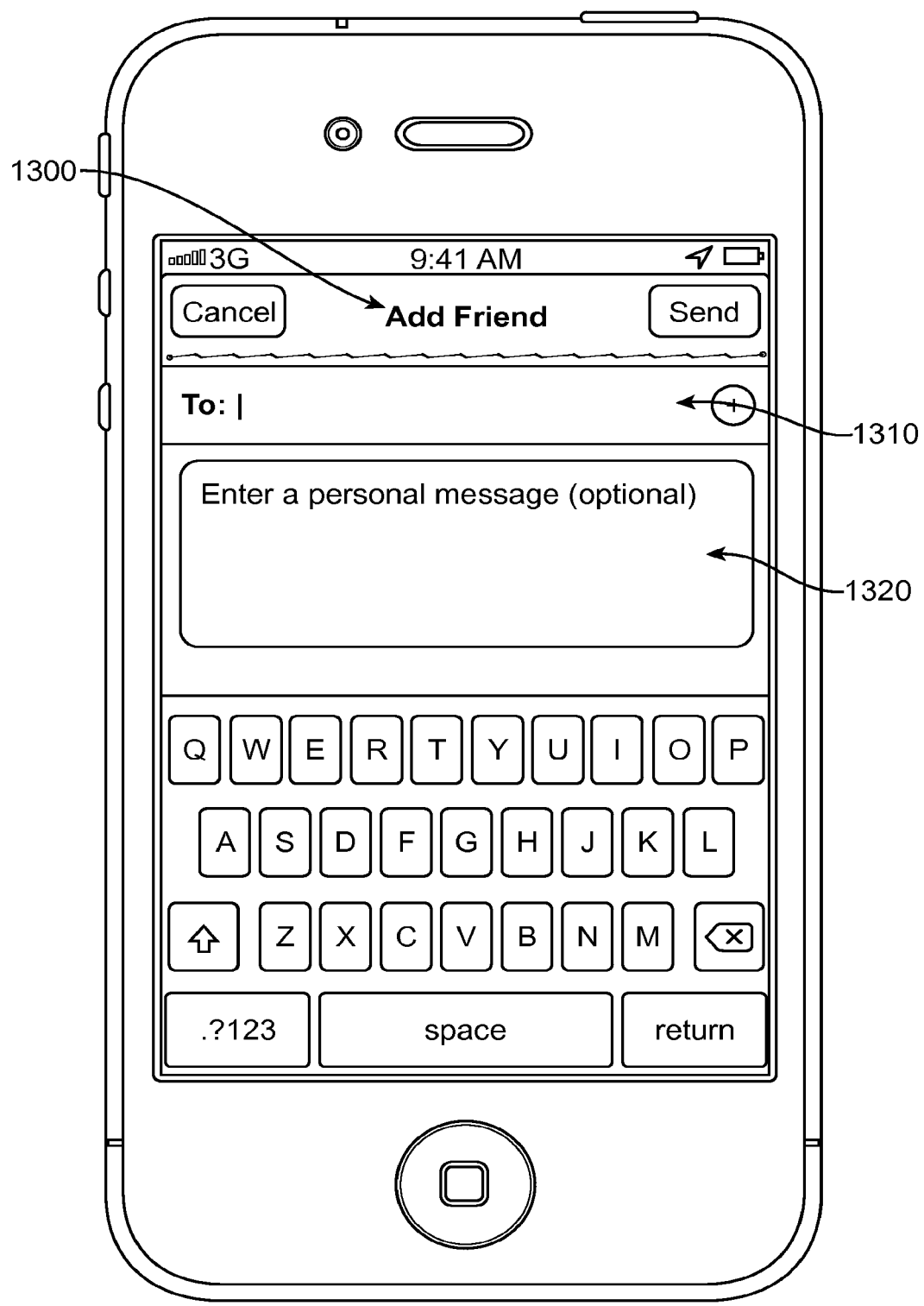
FIGS. 13-15 illustrate exemplary user interfaces depicting how a user may send to friends invitations to be located.
Figure 14:
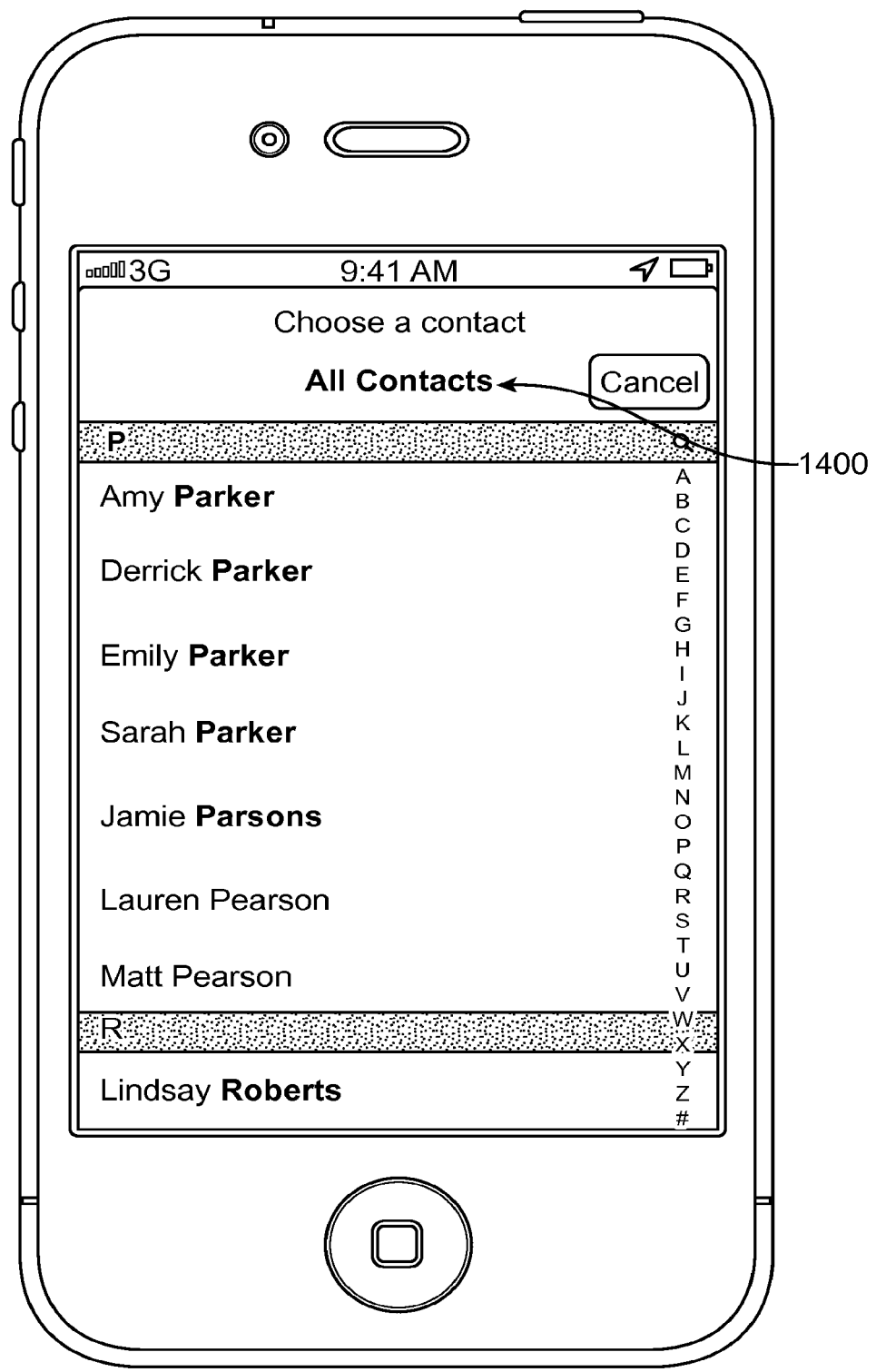

When a user wishes to send to a friend an invitation to share their location, "Add Friend" interface 1300, as shown in FIG. 13, may be used. In interface 1300, the user may enter the contact information of the friend/invitee at 1310 and may also include an optional personal message at 1320. As mentioned above, the contact information may be obtained from other services or applications located on the user's device, as is shown in contacts list 1400 in FIG. 14.

Figure 15:
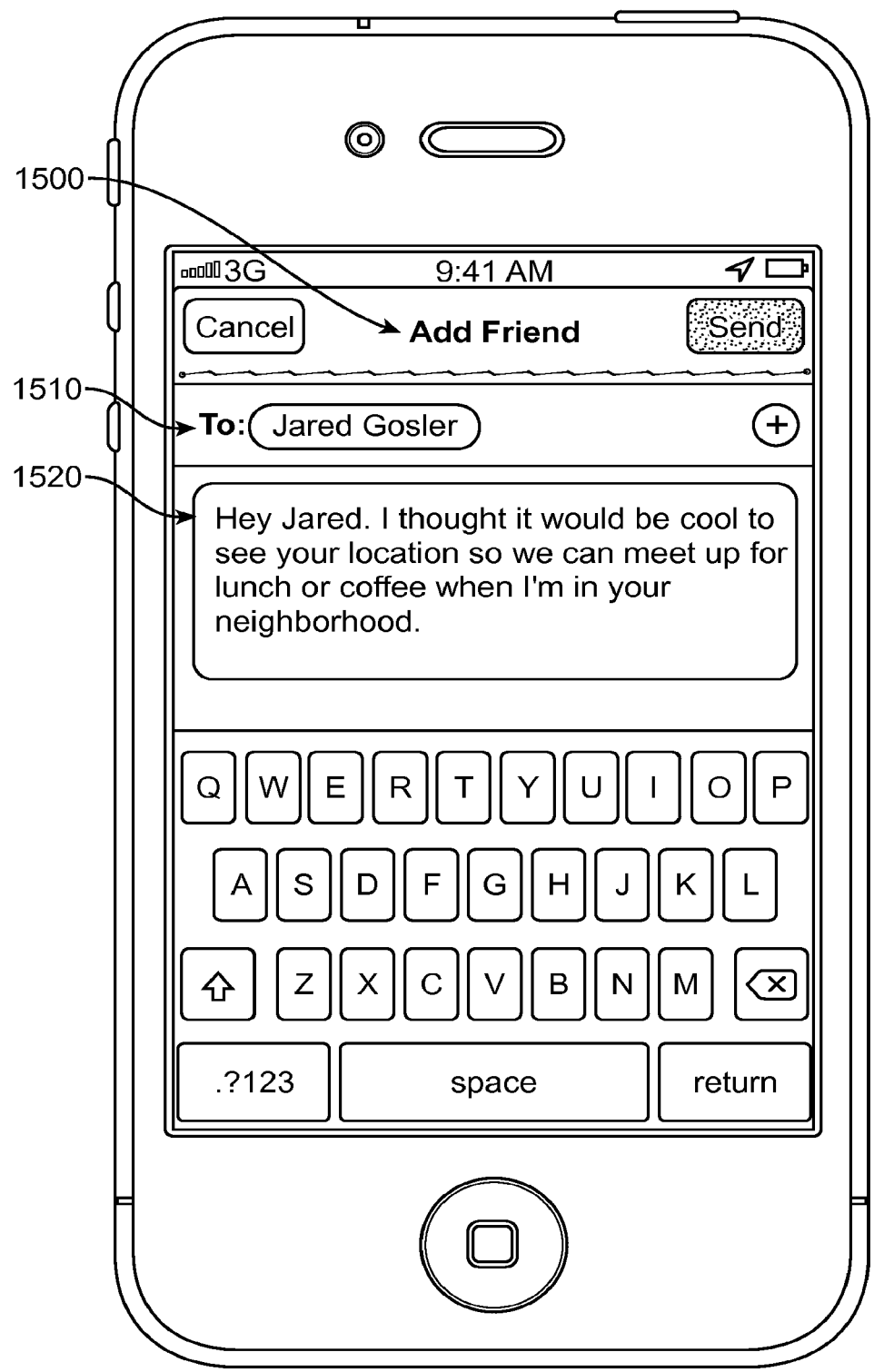

FIG. 15 shows a completed add friend request form 1500 with the name of the contact (preferably an embedded link to the contact's e-mail address, phone number, or other relevant contact information) entered at 1510. Also shown is a brief personal message 1520.

Figure 16:
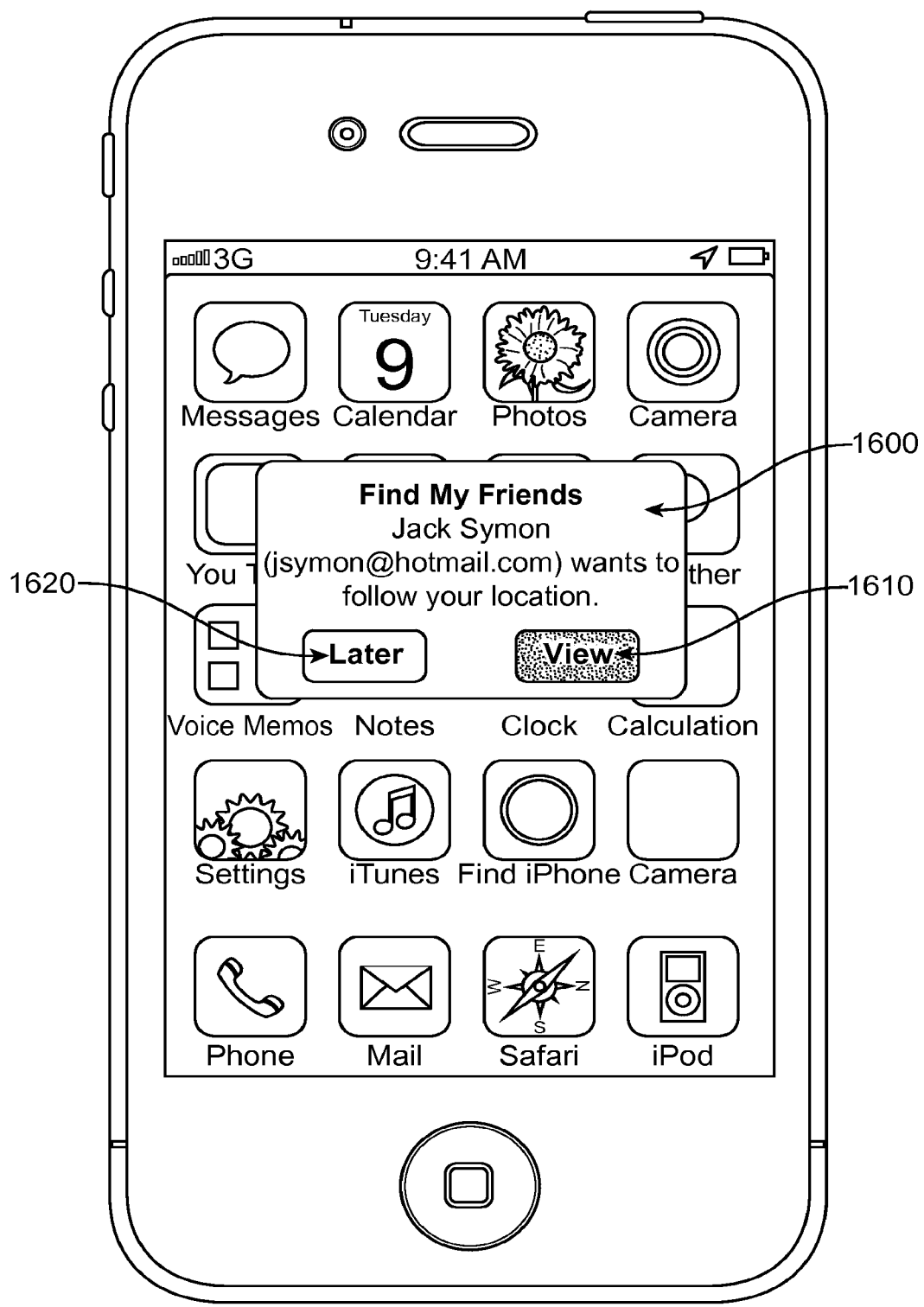
FIGS. 16-17 illustrate exemplary user interfaces depicting how a user may receive and respond to an invitation to be located.

FIG. 16 shows one way a friend may be notified that he or she has received an invitation to share their location with the requesting user in window 1600. As presented to the friend in window 1600, the user may either view the invitation immediately by selecting button 1610 or may choose to view the invitation at a later time by selecting button 1620. Note that this notification may preferably be in the form of a system-based message that provides notification regardless of any particular application currently running.

Figure 17:
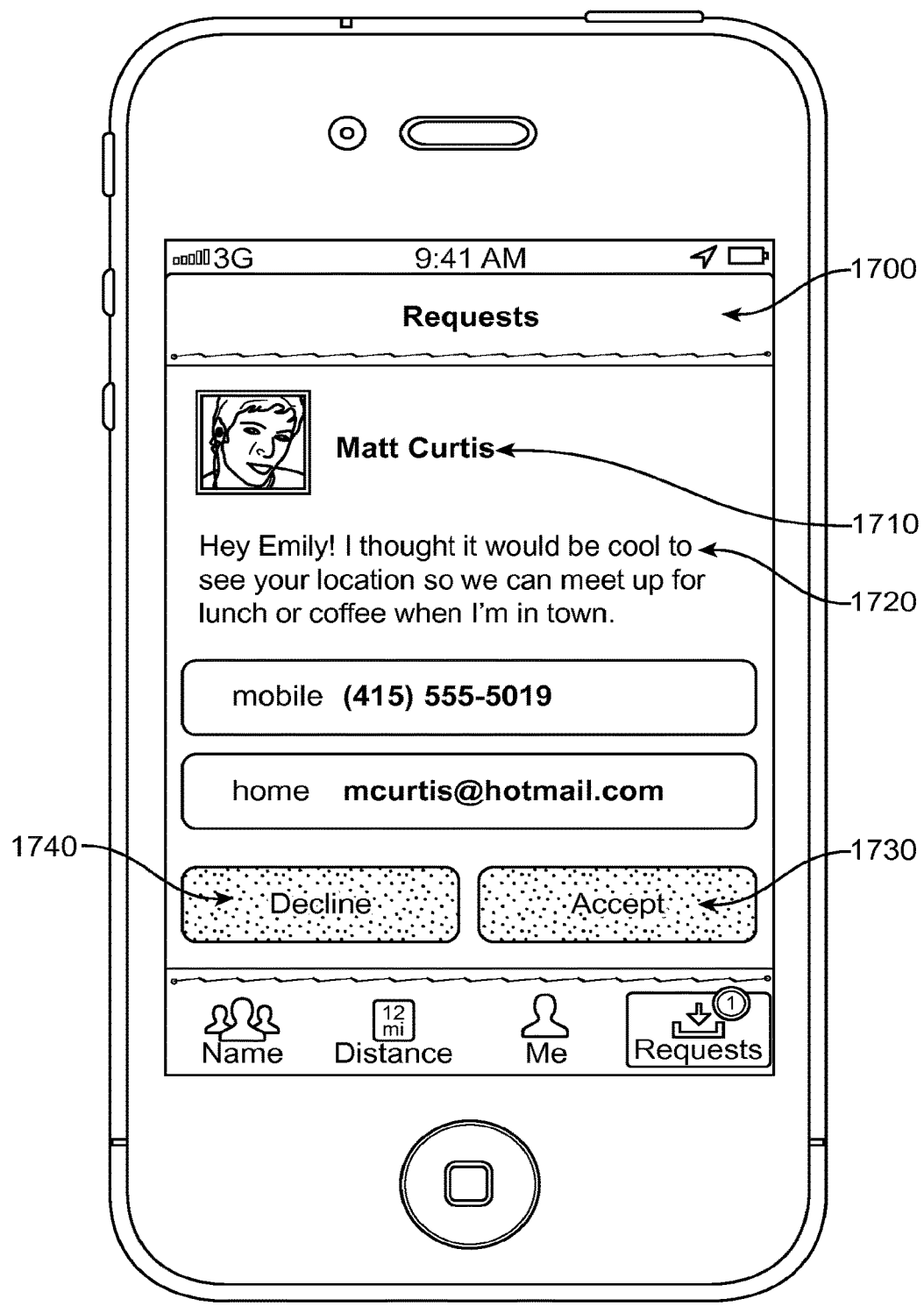

When the friend selects to view the invitation, he or she is presented with a request message 1700, as shown in FIG. 17. In request message 1700, the invitation preferably includes the name of the inviter 1710 and a brief personal message 1720. In addition, the invitation may include an accept button 1730 and a decline button 1740.

Figure 18:
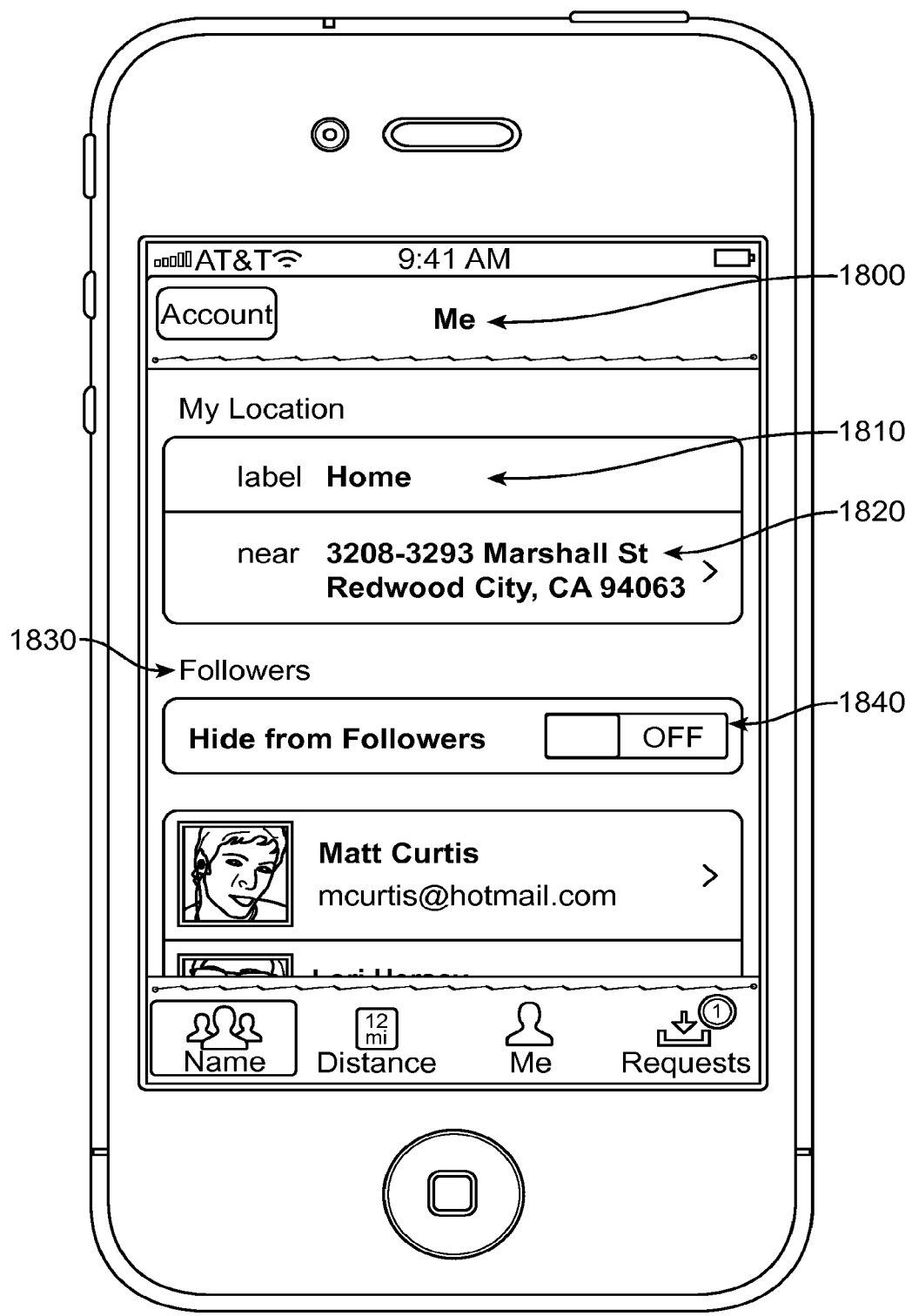
FIGS. 18-20 illustrate exemplary user interfaces depicting how a user may change his or her location information.

Referring now to FIG. 18, a mobile device user may maintain certain items associated with his or her account in interface 1800. In interface 1800, a user may, for example set a label 1810 to his or her present location in field 1820. A user may also review the list of followers 1830 which include all of the friends whom he or she has accepted invitations to be followed. A user may additionally select to hide from all of his or her followers by toggling switch 1840.

Figure 19:
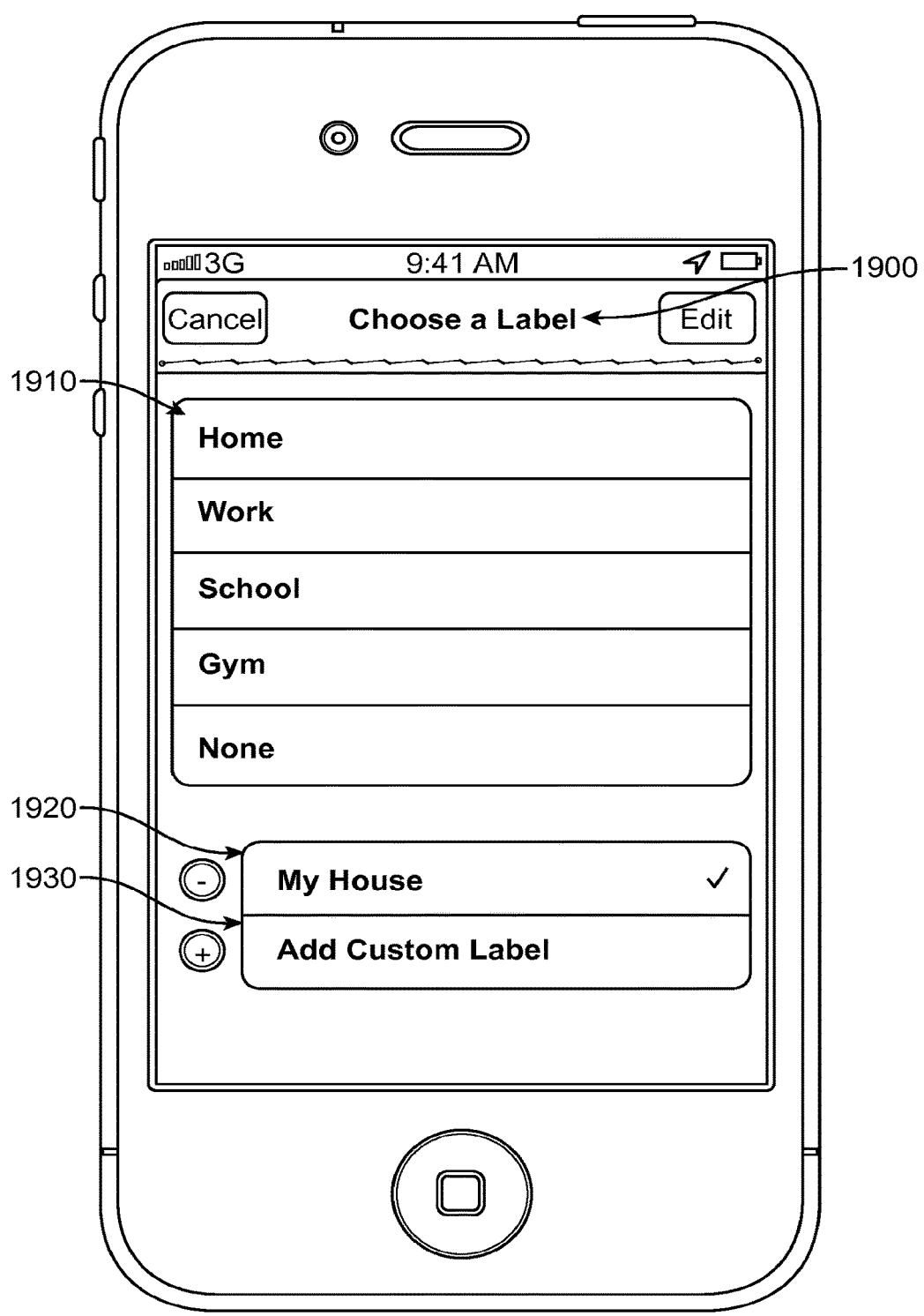
Figure 20:
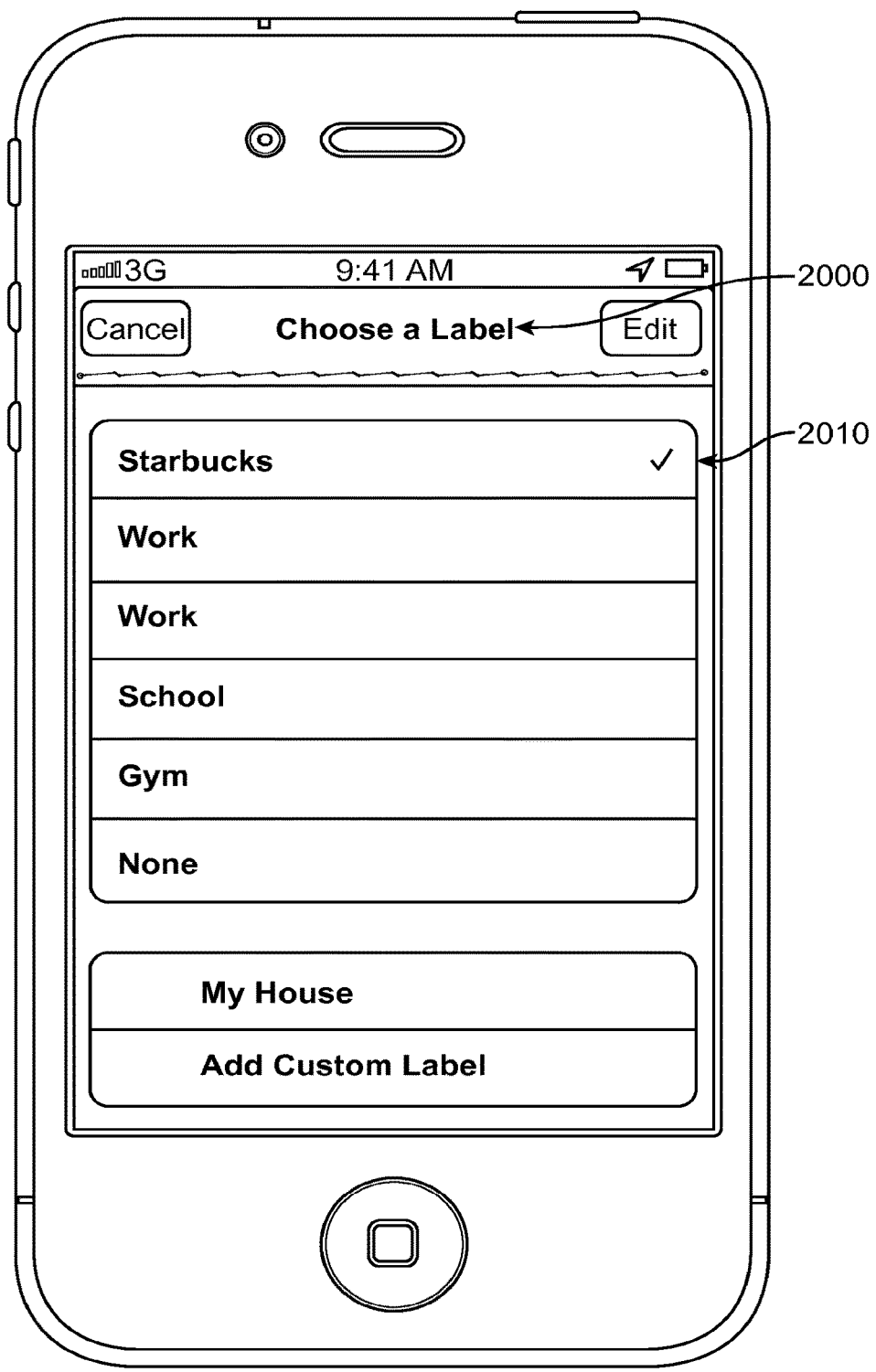

With respect to assigning labels to certain locations, interface 1900 of FIG. 19 may be presented to a user for this purpose. In interface 1900, a user may select one of the prepared labels 1910 or may add a custom label by entering text into field 1930. The current label in use is shown in field 1920. In addition to the prepared labels 1910 in interface 1900, additional location-specific label options may be automatically added, as is shown in interface 2000 in FIG. 20. As is shown in FIG. 20, location label 2010 has been added to the list of prepared location labels. A label such as label 2010 may be added when the user is determined to be located in the vicinity of a Starbucks for example.

To further explain certain embodiments in this disclosure, the following use scenarios are presented to show how certain users of mobile devices may be able to use one or more embodiments in the disclosure to locate his or her friends.

One scenario may occur when a mobile device user is located somewhere, say downtown Palo Alto, at noon and wants to know if any of his friends are in the vicinity and are available for a quick lunch. The user may be able to use an embodiment in the present disclosure to see the location of his or her friends, identify one that is close by, and subsequently make contact.

A second scenario may arise when there is a need or desire by users of mobile devices to allow others to know where they are at certain times. One such situation is where a mobile device user may, for example, be training for a marathon and is outside running for miles each day. This user wishes to have her partner aware of her location during this period of time so that she can always be located in case something happens and may therefore benefit from embodiments in this disclosure. Also, when this person is actually participating in the marathon, her friends may want to know at what part of the course she has made it to so that they may be able to be present at certain locations during the race to cheer her on. In such a scenario, the user would benefit from embodiments of the disclosure having a map of the race course superimposed onto a street map of the area such that the users may be able to see the location of the runner and have some indication about the location where she will be heading to next.

A third scenario may arise when users of mobile devices wish to receive an indication that someone has reached a certain location. In such a scenario, one user of a mobile device may, for example, be embarking on a road trip and another person wants to be notified when he or she has arrived. Such a scenario might include a parent who is allowing her teenage son to take the family car on a holiday weekend to drive to visit his cousins that live several hours away. Although the parent has asked that the son call as soon as he arrives, he is often forgetful and does not do so. To overcome this, the parent or son may take advantage of an embodiment of the present disclosure where they may set an alert to automatically notify the parent when the son has arrived at the destination. In the interim, the parent may additionally use other embodiments to manually locate the son's mobile device to make sure that he has not gotten lost.

A fourth scenario may arise when users of mobile devices wish to receive a notification when someone has entered a certain geographic location. For example, a person commutes to and from the city using public transportation but does not live in walking distance to the train or bus stop. Rather than driving and parking, the person may rely on a spouse or partner to pick her up in the evenings or whenever there is inclement weather. As certain busses and train cars have rules and courtesies prohibiting talking on cell phones, the commuter may have to wait to call her spouse or partner until after she arrives and subsequently having to wait, for example, in the rain. The users would benefit from some embodiments of the disclosure that would allow for a way for the commuter's mobile device to notify her partner's device whenever she enters into a certain geographic region (i.e., is close to arriving at the bus or train stop) without requiring the commuter to place a call. Thus, the commuter and her partner may both arrive to the stop close to the same time.

Similarly, a fifth scenario includes users having certain household appliances that may be connected to a network and can perform certain tasks upon receiving a notification when a person enters a certain area. For example, when a person is traveling to her vacation home out in the mountains, certain appliances in the vacation home such as, for example, the furnace and front porch light, may turn on when the person enters into a certain geographic area (i.e., gets close to the home). An embodiment of this disclosure would enable a user to have and benefit from such a configuration.

A sixth scenario may arise when someone wishes to receive a notification when a mobile device user has left a certain geographic location. For example, a parent has asked his daughter to stay at home for the weekend to finish a school assignment that is due the following Monday. If the daughter leaves the neighborhood with her mobile device, the parent may be notified. Aspects of the disclosed technology would enable a parent to receive such notifications.

A seventh scenario may arise when some mobile device users wish to be located for only a brief period of time. For example, a person is on a business trip in a city and wants to be able to meet up for dinner with an old friend who lives in that city. Since she is not normally in that city and does not often interact with this old friend, she does not want the old friend to be able to locate her all the time. One embodiment of the disclosure employs a "day pass" which the person may send to the old friend to allow the old friend to locate her for the next 24 hours. After that time, the day pass is expired and the old friend may not be able to locate the person anymore.

In an eighth scenario, a user may select a number of persons in her contact list to all share location information with each other for a limited period of time. For example, a user is in town to attend a conference such as Apple's WWDC. The user knows that some people that she knows are also attending the conference and she would like to know their whereabouts during the event. One embodiment of the disclosure enables this user to send an invitation to the persons that she wants to locate at the conference. When the user's acquaintances accept her invitation, she and the acquaintances will be able to locate each other. Certain limits on this ability to locate each other may be set by a user, however, such as certain windows of time during the day (such as, only during the conference), or until an expiration time.

Figure 21:
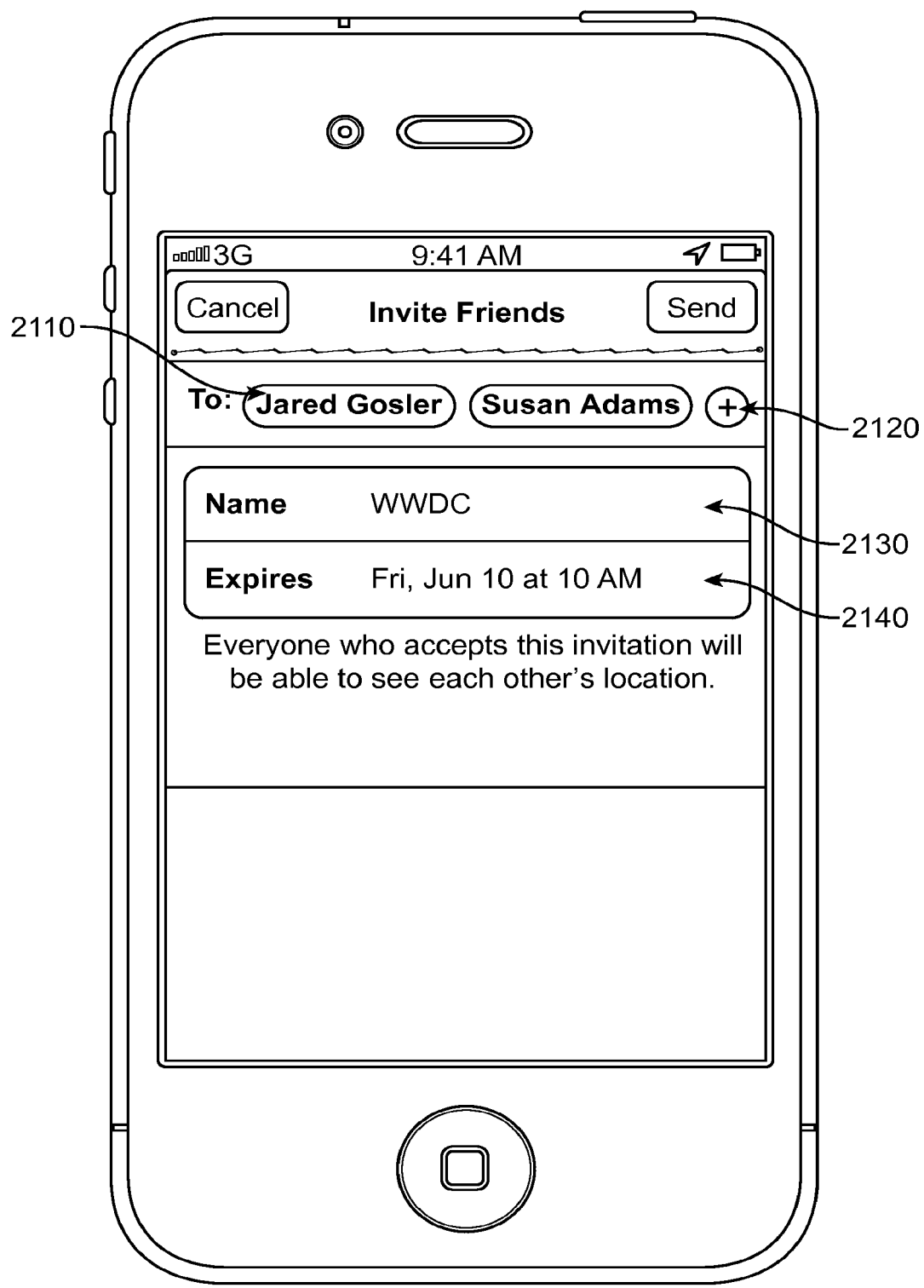
FIGS. 21-24 illustrate exemplary user interfaces depicting how an invitation to share location information until an expiration time may be configured and displayed.

FIGS. 21-24 disclose the configuration of certain interfaces that may be used to share location information until an expiration time and may be used, for example, during a scenario such as the one explained in scenario eight. FIG. 21 displays one embodiment of an invitation interface screen in which the user may configure and send an invitation to friends to share their location. The user may add friends to the invitation by tapping the "+" button 2120, similar to the one described in FIG. 7. The friends that have been added to the invitation may be displayed on the screen 2110 to indicate that they have been added, similar to that of a "To:" line in a composed e-mail. FIG. 21 shows that the user has added two friends to the invitation, as their names; "Jared Gosler" and "Susan Adams" are displayed.

In the exemplary interface shown in FIG. 21, the user may also, for example, relate the invitation to enter a particular event 2130 and set an expiration time 2140. However other configuration options such as setting an applicable geographical area and other time constraints may also be offered. In FIG. 21, the user has related the invitation to the "WWDC" conference and set an expiration time to be "Fri, June 10 at 10 AM." In some embodiments, the relating of the invitation to a particular event may enable the users to have access to certain maps and wireless access ports hosted by the particular event, which may, for example, offer more accurate non-GPS location information (i.e., specific conference rooms). The expiration time sets a limit on how long the user and the invited friends may share location information.

Figure 22:
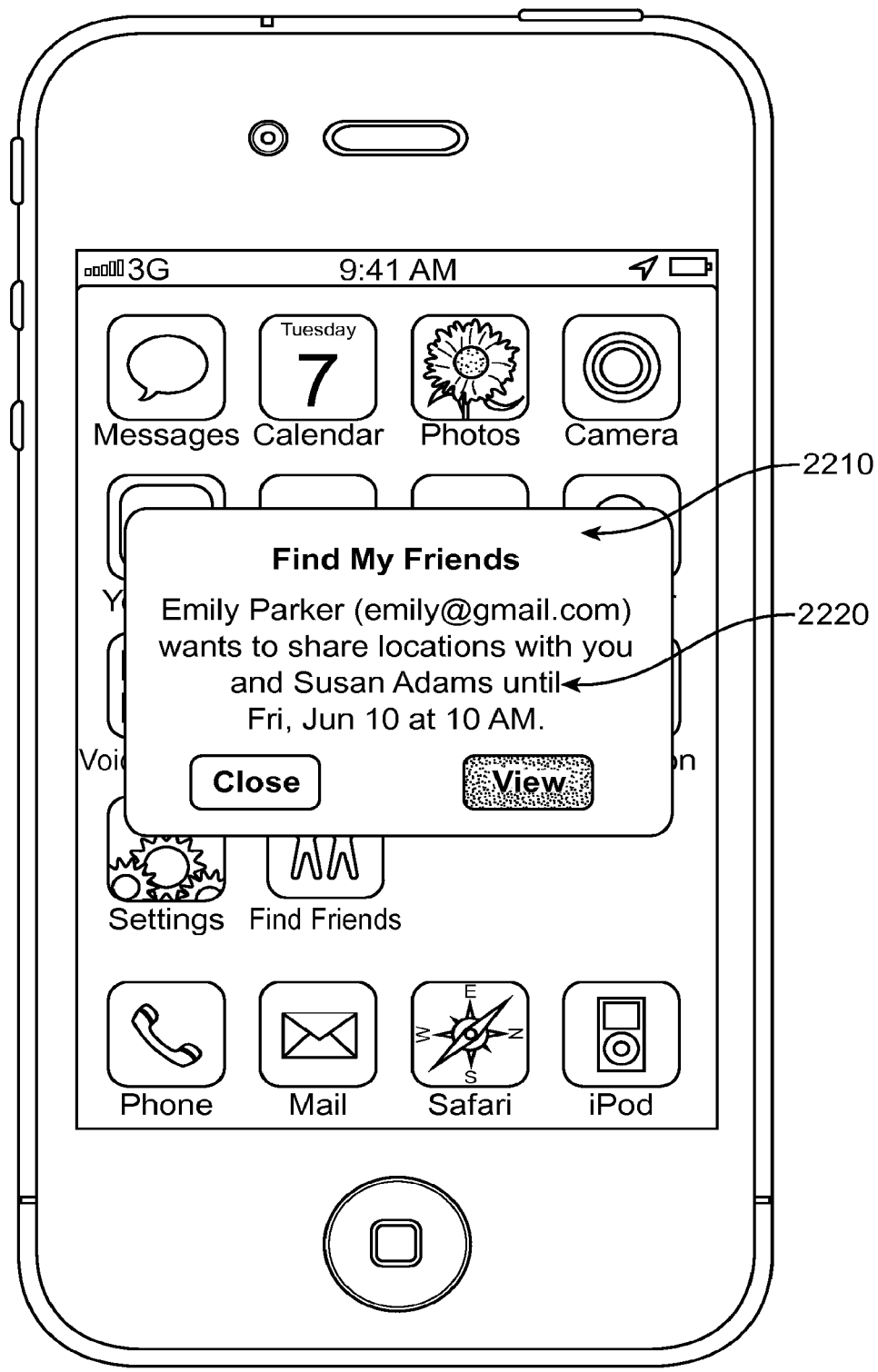

FIG. 22 shows an alert that an invited friend may receive upon receiving an invitation to share location information sent by the user. A message box 2210 may be displayed providing notification of the request to the friend. The text 2220 of the request may explain that the friend has been invited to share location information with the user and another person (Susan Adams) until the set expiration time. In this embodiment the message box 2210 includes buttons to enable the device user to close the message box or view the invitation. In other embodiments the message box may also include additional or different buttons to accept, ignore, or reject the invitation.

Figure 23:
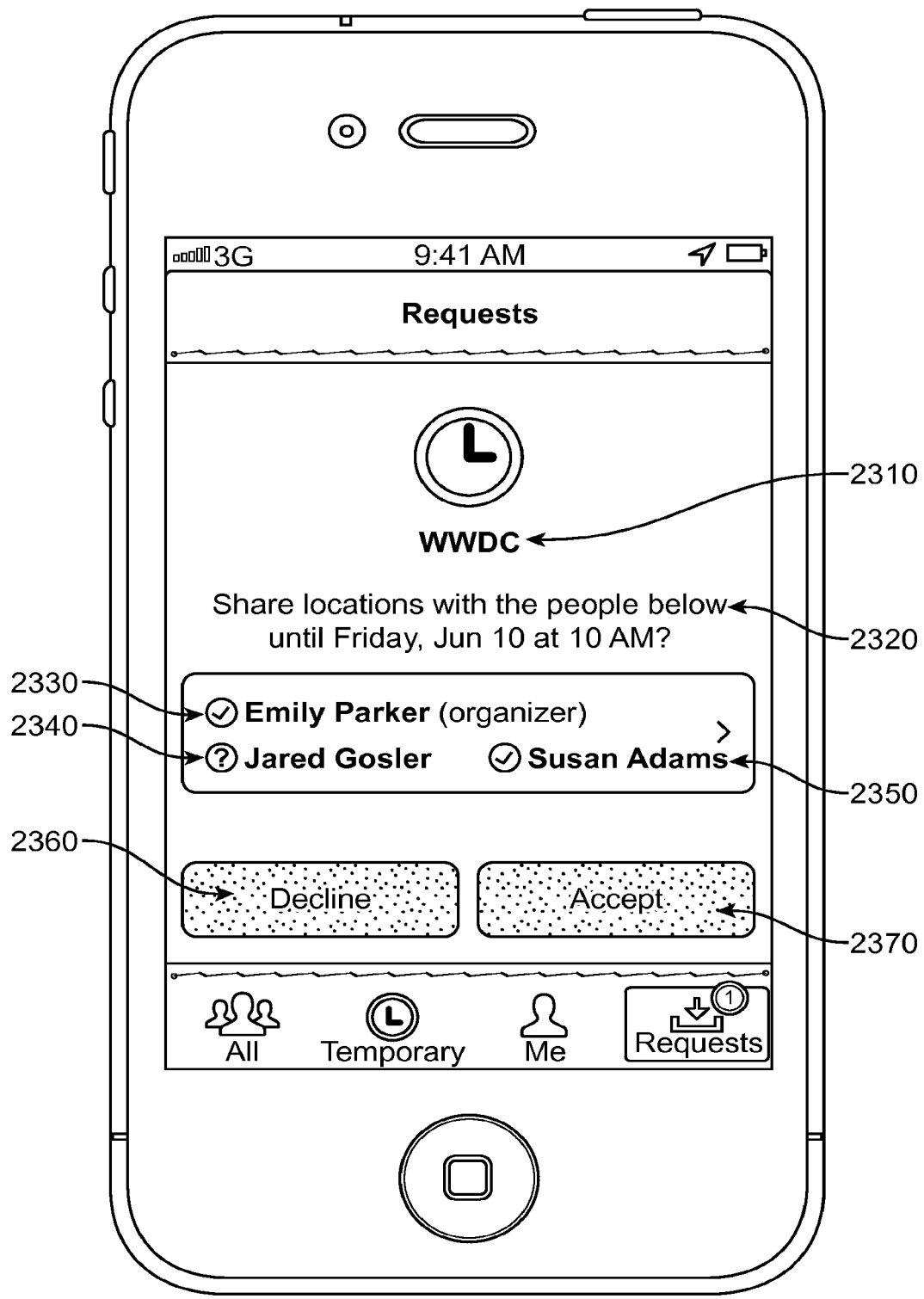

FIG. 23 shows an exemplary embodiment displaying an invitation. This invitation may include the related event 2310 and text 2320 explaining the details of the request to share location information including the set expiration time. The names of all parties invited to share location invitation and their response status 2330, 2340, and 2350 may also be displayed. As illustrated, a check mark may be placed next to a person's name to indicate that the person has accepted the invitation. Similarly, a question mark may be displayed next to a person's name to indicate that the person has not yet replied to the invitation and so it is still uncertain whether they will accept the invitation. If a person declines the invitation, an X may be displayed next to their name to indicate their decision to not share location information. This may also indicate that the person is not in the geographic area of the conference and/or, in some cases, has not checked in. Upon receipt of an invitation, a device user may decline or accept by selecting one of the available options 2360 and 2370.

Figure 24:
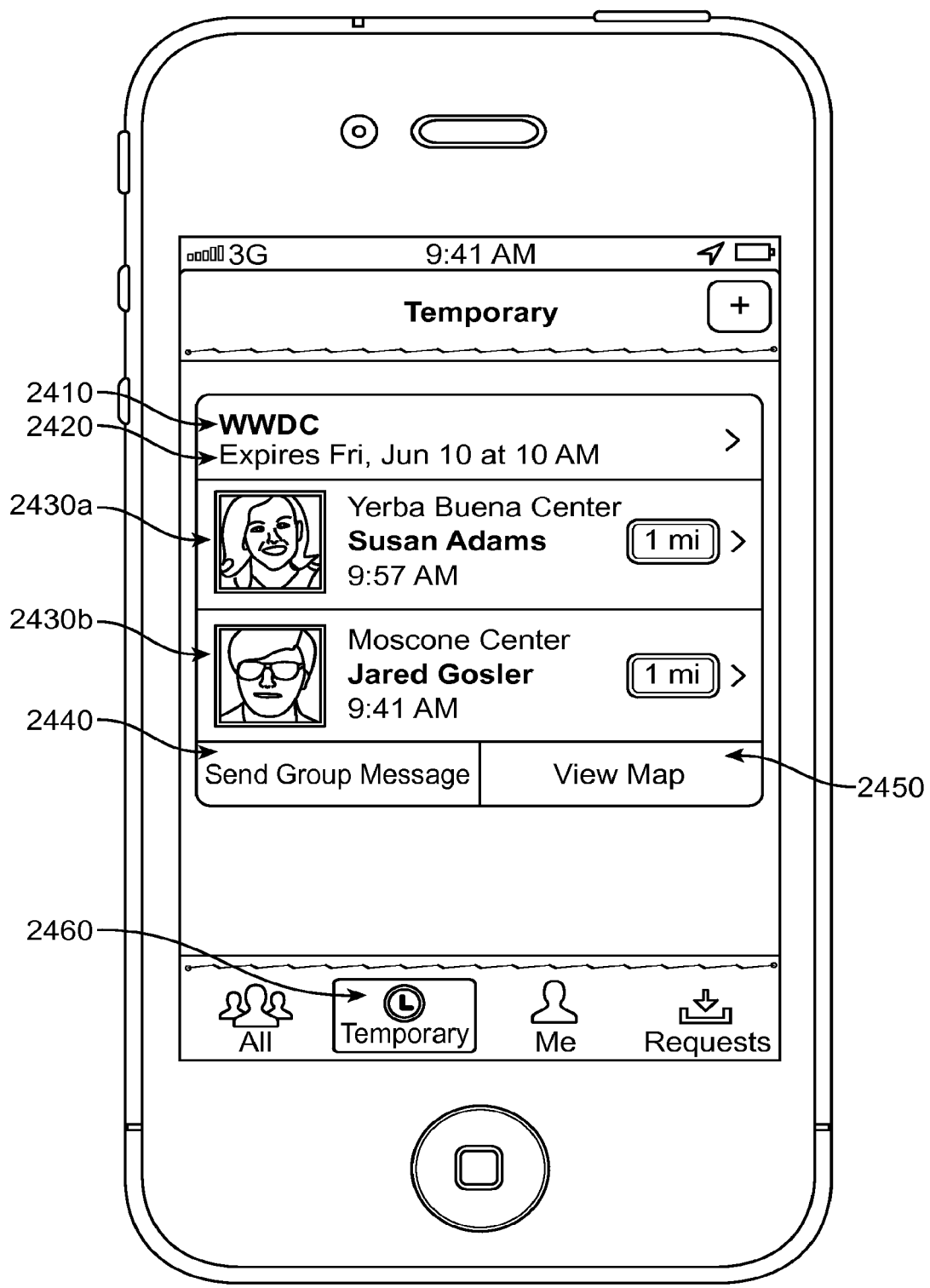

FIG. 24 illustrates an embodiment showing what a user would likely see when the user selects to view the temporary friend 2460 and after invited friends have accepted a user's invitation to share limited-time location information. As shown in FIG. 24, there is an event 2410, WWDC, associated with the sharing of this location information. As mentioned above, in some embodiments, certain additional features may become available when the locate is associate with a particular hosted event, like connecting to local geo-coded access ports and receiving notifications from the event organizer. Alternatively or in addition, entering the event name and associating the locate with an event may simply auto-fill information such as the end time of the conference or event. Here, the end time 2420 of the locate permission is shown to expire on June 10 at 10 am. Information relating to the friends that have accepted a temporary locate request is shown on this display 2430a, 2430b. Similar to the embodiment shown in FIG. 9, the friend information may include, among other things, the name of the friend, their last known location and time of that last known location. Preferably specific to associating requests to a particular event, a user may be able to contact all of the other users on the list by clicking on a button to send a group message 2440. This button, when selected, may allow the user to compose one message which will be sent to each friend who accepted the invitation to share location information. The user may also select a button to view a map 2450 which, when selected, may display an overhead map which indicates each friend's location upon it. As mentioned above, the map may be a typical location map or may be a map customized and associated with the related event (i.e., a map showing the rooms inside of the Moscone Center and Yerba Buena Center).

Figure 25:
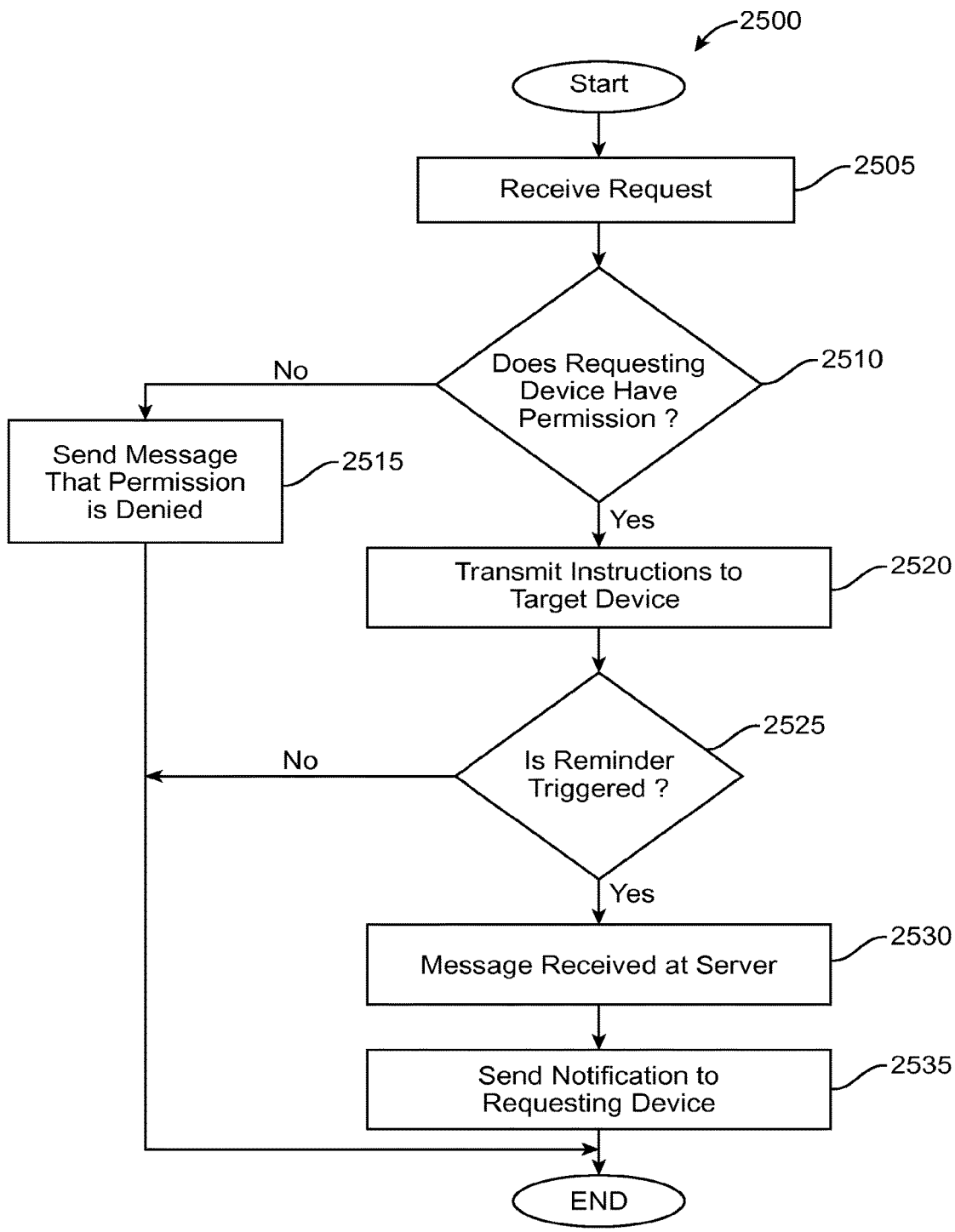
FIG. 25 illustrates an exemplary method embodiment in which a requesting user can set a reminder that is triggered by a target device.

FIG. 25 illustrates an exemplary method 2500 in which a requesting device can set a reminder that is triggered by a target user device. The reminder can be configured to notify the requesting device upon a predetermined trigger being met on the other target device. For example, a mother wishing to know when her child leaves school can create a reminder that is triggered upon her child's device physically leaving school. The reminder can further be configured to send a notification to the mother's device upon the reminder being triggered. Alternatively, a mother can set a reminder that is triggered when the child arrives at school and notifies the mother's device accordingly.

As illustrated, the method begins at block 2505 when a request is received at a server to set a reminder that is triggered on a target device. The request can be sent by a requesting user device to set the reminder on the target device. The request can include an identifier, such as a telephone number, identifying the target device. In some embodiments, the request can also include parameters that determine when the reminder is triggered. For example, the parameters can include a location and a condition. The location parameter can identify a location and the condition can identify an action to be performed by the target device in relation to the location. For example, using these parameters, a mother wishing to be notified that her child has arrived at school can request that a reminder be set that is triggered by her child's device and set the location parameter to be the child's school and the condition to be arrival. Accordingly, the requested reminder can be triggered upon the child's device performing the condition (arrival) in relation to the location (child's school), and thus the reminder will be triggered when the child's device arrives at the child's school.

Figure 26A:
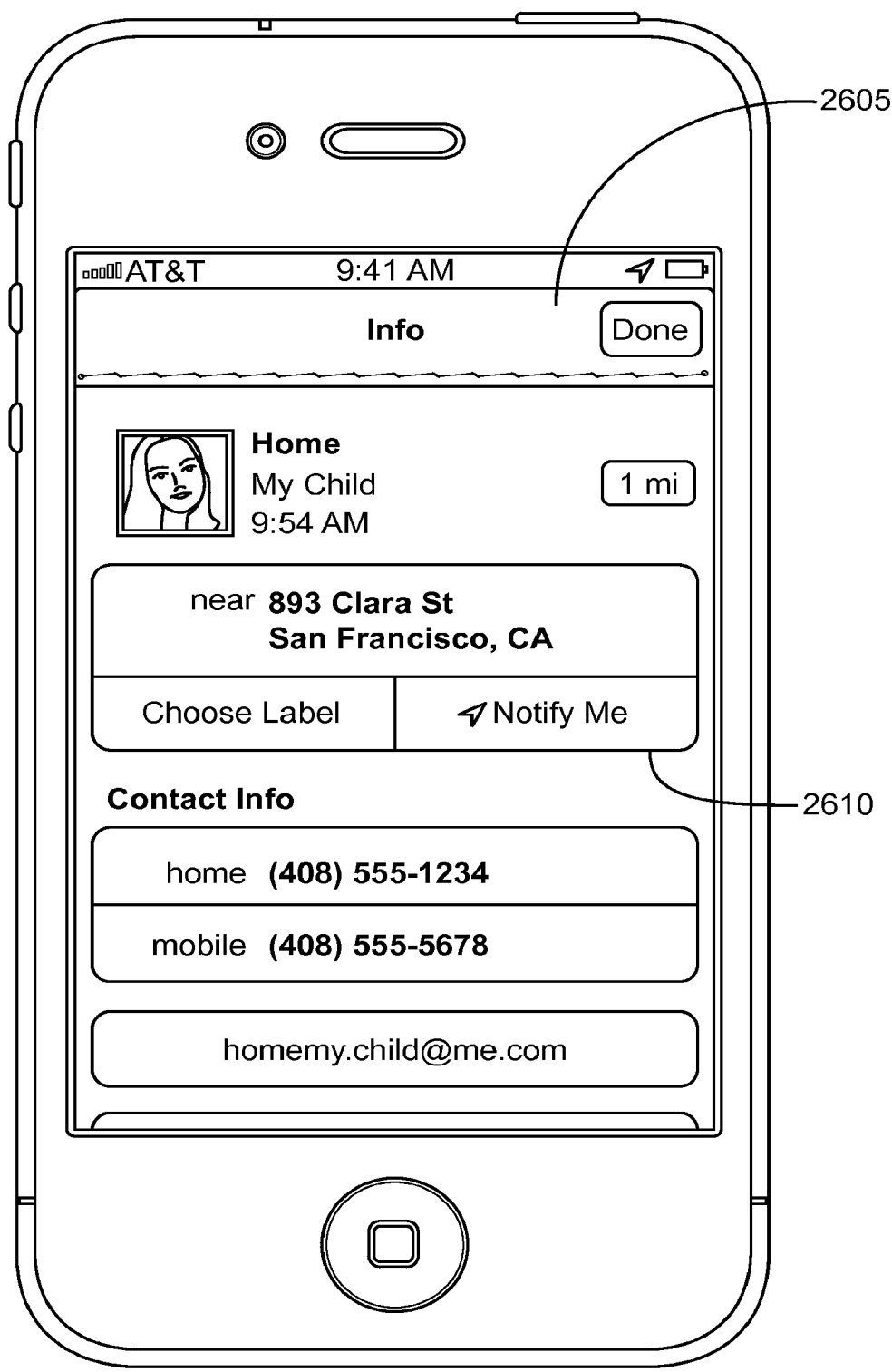
FIGS. 26*a* and 26*b* illustrate screen shots of an exemplary embodiment of an interface configured to request that a reminder that is triggered by a target device be set.
Figure 26B:
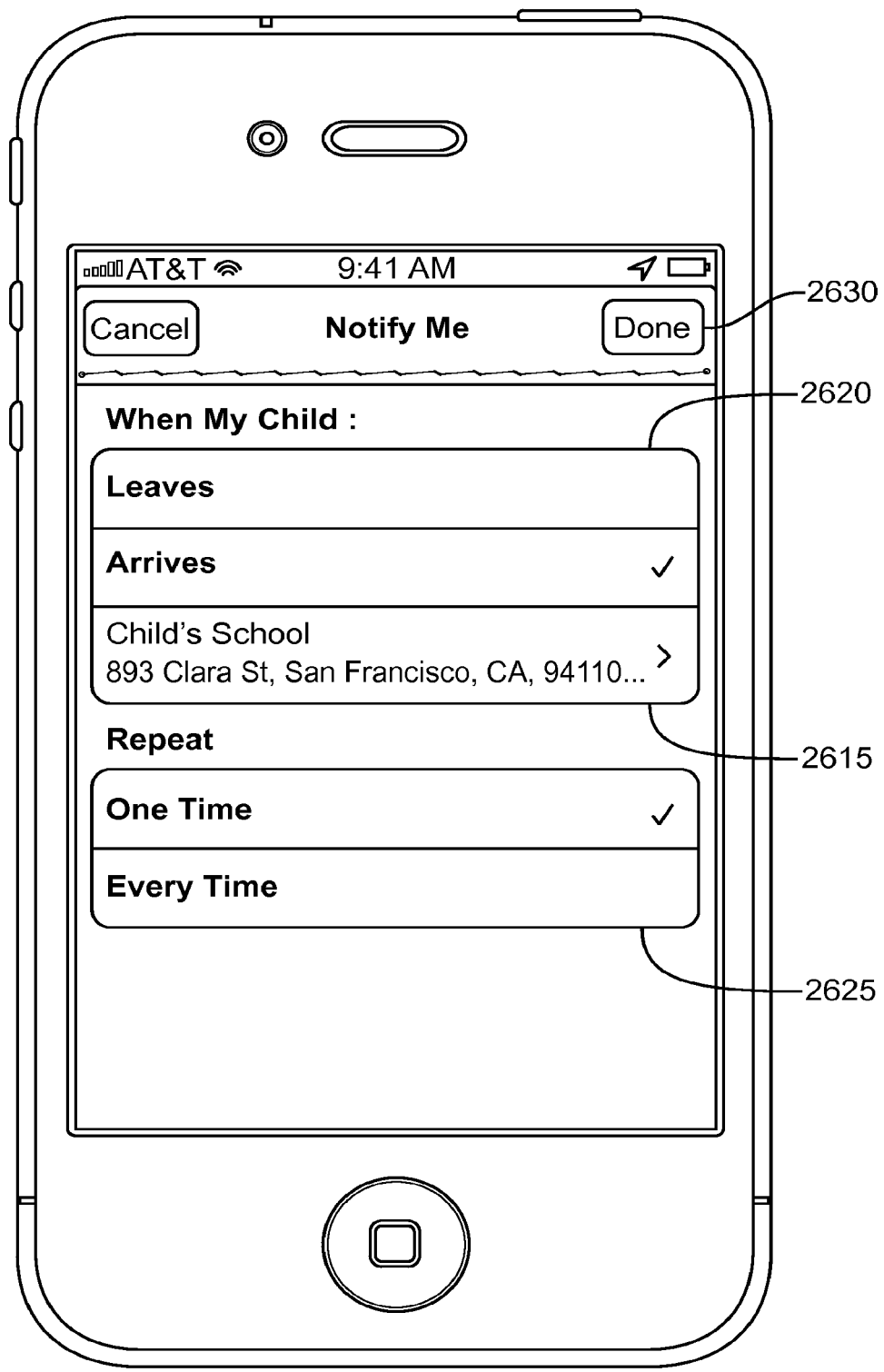

FIGS. 26a and 26b illustrate screen shots of an exemplary embodiment of an interface configured to create a request to set a reminder that is triggered by a target device. As illustrated in FIG. 26a, a record 2605 of a contact stored on a requesting user device can include a button configured to create a reminder that is triggered by the contact's user device. Upon selecting this button 2610, the stored contact information can be set as the identifier and a second interface screen, illustrated in FIG. 26b, can be presented. This screen can be configured to receive further input from the user defining the parameters for the reminder. The interface can be configured to receive a location 2615 and condition 2620 from the user. As illustrated, the user has selected the location 2615 to be child's school and the condition 2620 to be arrival.

The location parameter can be set in numerous ways. For example, in some embodiments, the location can be selected by selecting a location on a map presented to the user. The interface can be configured to present a map to a user upon which a user can select a point as the location. The interface can be configured to use the GPS coordinates of the selected point as the location. In some embodiments, the user can select the location from previously saved locations set by the user. For example, a mother can select her child's school on the map and save the location as child's school. The mother can then easily select this location in the future by referring to it by the chosen name, child's school. In some embodiments, the location can be selected by entering the name of a location or an address and the entered name or address can be searched against map data to find the location.

The interface can also be configured to receive a frequency 2625 parameter. As illustrated, the user can select to set the reminder to trigger just once or every time the defined condition is met at the location. For example, a mother can request that she be notified every time the child arrives at school, or alternatively, choose to only be notified the one time when the child next arrives at school. Upon setting the parameters, the user can select the done button 2630 to complete the request and send the request to the server.

In some embodiments, the request can be created using a voice command feature on the requesting user device. For example, a mother can simply say the request, "let me know when my child arrives at school," and a request can be created to set a reminder that is triggered by the child's device with the location parameter set as school and the condition parameter set as arrival.

Returning to FIG. 25, after receiving the request 2505, the server then determines whether the requesting device has permission 2510 to set a reminder that is triggered by the identified target user device. For example, in some embodiments permission to set a reminder is granted if the user of the target device has previously agreed to share their location with the requesting user. In some embodiments, permission is granted only if the target user device has specifically granted the requesting device permission to set a reminder on the target device. In some embodiments, the target device can be configured to toggle on and off whether permission is granted.

In some embodiments, the server can determine whether permission is granted 2510 by checking a database which stores data regarding users. This database can include a record of each device and which other devices have been granted permission to receive location information from each device as well as which other devices have been granted permission to set a reminder trigger by each device. Alternatively, in some embodiments, the server can send a message directly to the target device to determine whether permission is granted 2510. For example, in some embodiments, data regarding which devices have been granted permission can be stored directly on the target user device. In some embodiments, the server can send the message to check whether permission has been toggled off on the target device although permission has been previously granted to the requesting device. In some embodiments, the server sends a message to the target device requesting permission to set the reminder.

If permission is not granted, the server can send a message 2515 to the requesting user indicating that the requesting user lacks permission to set a reminder triggered by the target device and the method ends. If permission is granted, at step 2510 the server can be configured to transmit instructions to the target device 2520 to set up a reminder based on the parameters included in the received request. The instructions can include the location and condition associated with the reminder.

Once received by the target device, the reminder parameters can be stored in memory on the target device and the target device can be configured to monitor the status of the target device to determine whether the reminder has been triggered 2525 based on the stored parameters. For example, a daemon running on the target user device can interact with a GPS component of the target device to periodically request the GPS position of the target device. The coordinates can be compared to the location and condition to determine whether the reminder has been triggered 2525.

Alternatively, in some embodiments, the server can be configured to monitor whether the target device has triggered the reminder. For example, the server can be configured to communicate with the daemon running on the user device to request the GPS position of the target device and determine whether the reminder has been triggered 2525.

To determine whether the reminder has been triggered 2525, in some embodiments, the daemon can create a geo-fence around the target device. A geo-fence can be an imaginary perimeter of a set distance created around the target device. The geo fence can be used to determine the target device's position in relation to the location parameter. For example, if the location has been set as child's school and the condition is arrival, a geo fence can be created surrounding the child's device that spans 20 feet. The child can be determined to have arrived at school upon a determination that the school is positioned anywhere within the 20 foot geo-fence surrounding the child's device. Alternatively, the geo-fence can be created around the location and the determination can be based on the target device's position being within the geo-fence surrounding the location. For example, when the child's device is positioned within a 20 foot geo-fence surrounding the child's school.

A geo-fence can be similarly used to determine when the target device leaves a location. Once it is determined that the target device is not within the geo-fence surrounding the location, or alternatively, the location is no longer within the geo-fence surrounding the target device, it can be determined that the target device has left the location.

In some embodiments, the geo fence can be adjusted to different lengths to set a reminder when a user is near a location. For example, a mother that needs to pick her child up from a train station can request that a reminder be set upon her child arriving within 2 miles of the train station so that she has time to drive to the train station before her child arrives. To accomplish this, a geo-fence of two miles can be set around the child's device and the reminder can be triggered upon a determination that the train station is positioned within the geo-fence. Alternatively, the geo-fence can be set around the train station and the reminder is triggered upon a determination that the child's device is positioned within the geo-fence.

In some embodiments, a requesting user can specify an amount of time prior to arrival of the target device at the specified location to receive the notification and the size of the geo-fence can be adjusted automatically. For example, a mother that needs to pick up her child at a train station that is a 5 minute drive from her house can request that a reminder be set that is triggered when the child's device is 7 minutes from the train station. The size of the geo-fence can be adjusted to an appropriate length based on an approximation of how far the child's device will travel in the last 7 minutes of the journey. For example, if it is determined that the child will travel the final 3 miles in 7 minutes, the geo-fence can be set to 3 miles.

The approximation can be based on various factors. For example, the approximation can be based on the calculated speed determined from the target device's previous movements. Additionally, the approximation can take into consideration geographic considerations such as whether the target device is located on a freeway or in an urban city area. The approximation can also take into consideration assumptions about the target user's mode of transportation. For example, if the target device is located on a train track, it can be assumed that the target user is travelling by train. Alternatively, if the target device is location in the wilderness, it can be assumed that the target user is walking.

Upon a determination that the reminder has been triggered 2525, the target device can be configured to send a message to the server 2530 that the reminder has been triggered. The message can include the parameters of the reminder and the identifier of the requesting device. Alternatively, if the reminder is being monitored by the server, no message is sent from the target device.

Upon receiving the message, the server can be configured to send a notification to the requesting device 2535 that the reminder has been triggered by the target device. In some embodiments, the notification can be sent as a push notification through an open IP connection on the requesting device. In some embodiments the notification can be sent as a text message. Although text message and push notifications are used as examples, one skilled in the art would recognize that these are just exemplary ways of notifying the requesting device and other forms of communication can also be used.

The notification can also be configured to incorporate the reminder parameters to properly notify the user of what triggered the reminder. For example, if the location is set to child's school and the condition is set to arrival, the notification can state that the child has arrived at school. Alternatively, if the condition is set to departure, the notification can state that the child has left school.

Figure 27:
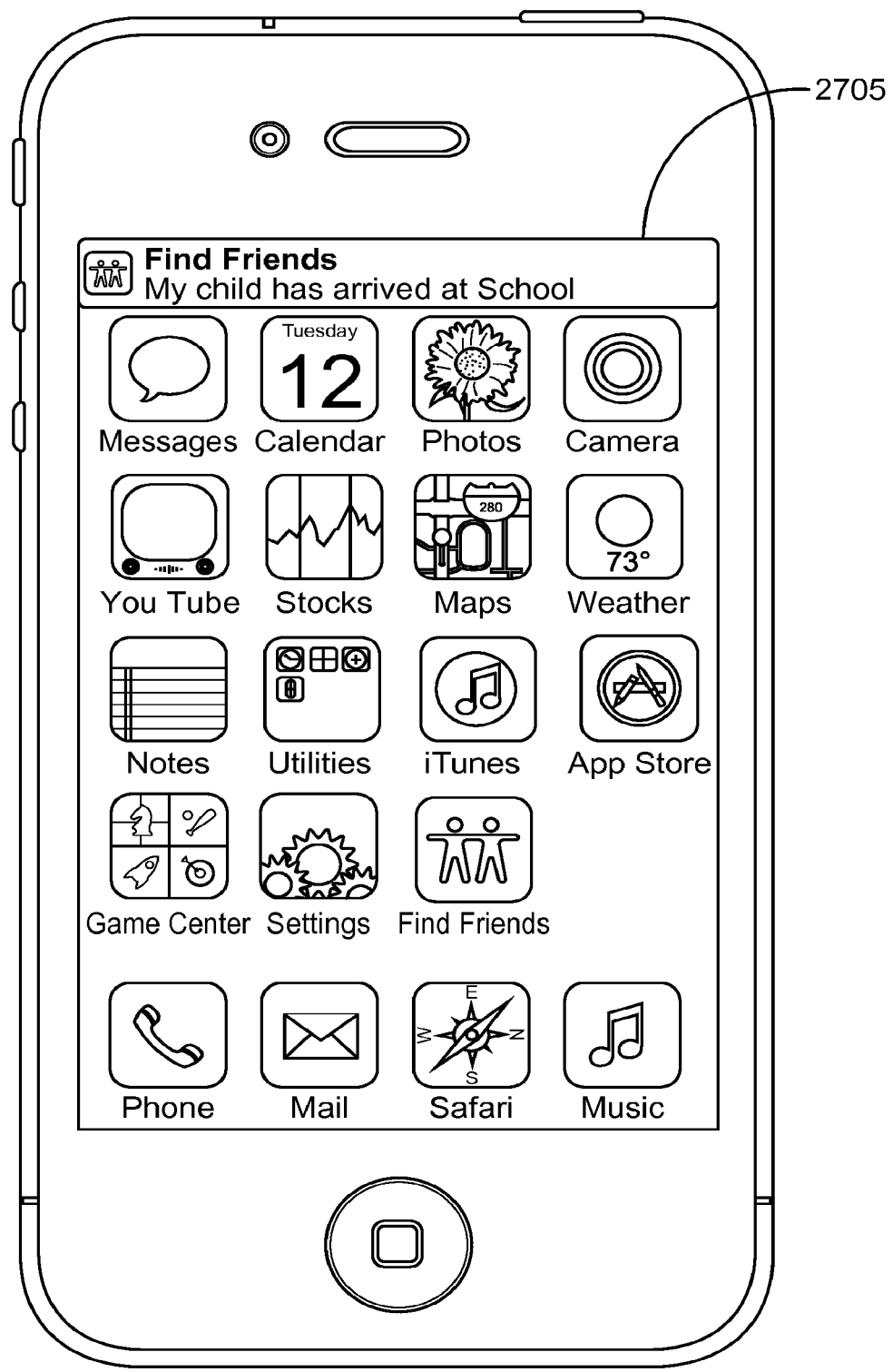
FIG. 27 illustrates a screenshot of an exemplary embodiment of a notification on the requesting user device that the reminder has been triggered.

FIG. 27 illustrates a screenshot of an exemplary embodiment of a notification on the requesting user's device that the reminder has been triggered. As illustrated, a notification 2705 can be presented at the top of the screen as a push notification. As illustrated, the notification can incorporate the reminder parameters to state the action that triggered the reminder and thus state that "child has arrived at school."

As described above, one aspect of the present technology is the gathering and use of data available from a user's mobile device. The present disclosure contemplates that in some instances, this gathered data may include personal information data that uniquely identifies or can be used to contact or locate a specific person. Such personal information data can include hardware information relating to the user device, location-based data, telephone numbers, email addresses, social media IDs such as TWITTER IDs, work and home addresses, friends, or any other identifying information. The user typically enters this data when establishing an account and/or during the use of the application.

The present disclosure recognizes that the use of such personal information data in the present technology can be used to the benefit of users. In addition to being necessary to provide the core feature of the present technology (i.e., locating users), the personal information data can also be used to better understand user behavior and facilitate and measure the effectiveness of applications. Further, other uses for personal information data that benefit the user are also contemplated by the present disclosure.

The present disclosure further contemplates that the entities responsible for the collection, analysis, disclosure, transfer, storage, or other use of such personal information data should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of location aware services, the present technology can be configured to allow users to select to "opt in" or "opt out" of participation in the sending of personal information data.

The present disclosure also contemplates that other methods or technologies may exist for blocking access to user's personal information data.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:
1. A method comprising:
receiving, by a server, a request from a first device to set up a reminder that is triggered by a second device entering or exiting a geofence surrounding a location, the request including data specifying how long the reminder will remain in effect on the second device before it expires;
determining, by the server, that a user-selectable permission setting on the second device indicates that permission is granted to share the location of the second device upon triggering of the reminder; and
transmitting, by the server, an instruction to the second device to set up the reminder on the second device.

2. The method of claim 1, further comprising:
receiving, by the server, first information from the second device indicating that the reminder has been triggered; and
transmitting, by the server, second information to the first device indicating that the reminder has been triggered.

3. The method of claim 1, wherein the request indicates that the reminder is triggered when the second device arrives at the location.

4. The method of claim 1, wherein the request indicates that the reminder is triggered when the second device departs from the location.

5. The method of claim 1, wherein the request indicates that the reminder is triggered when the second device enters or exits a geofence associated with the location.

6. The method of claim 1, wherein the request indicates that the reminder is repeated.

7. A method comprising:
receiving, by a mobile device, a request from a server to set up a reminder that is triggered by the mobile device entering or exiting a geofence surrounding a location, the request including data specifying how long the reminder will remain in effect on the mobile device before it expires;
determining, by the mobile device, that a user-selectable permission setting on the mobile device indicates that permission is granted to share a location of the mobile device in response to the reminder being triggered; and
setting, by the mobile device, the reminder on the mobile device.

8. The method of claim 7, further comprising:
determining, by the mobile device, that the reminder is triggered; and
sending information to the server indicating that the reminder has been triggered on the mobile device.

9. The method of claim 7, wherein the request indicates that the reminder is triggered when the mobile device arrives at the location.

10. The method of claim 7, wherein the request indicates that the reminder is triggered when the mobile device departs from the location.

11. The method of claim 7, wherein the request indicates that the reminder is triggered when the mobile device enters or exits a geofence associated with the location.

12. The method of claim 7, wherein the request indicates that the reminder is repeated.

13. A mobile device comprising:
one or more processors;
memory coupled to the one or more processors and configured to store instructions, which when executed by the one or more processors, causes the one or more processors to perform operations comprising:
receiving, from a server, a request to set up a reminder that is triggered by the mobile device entering or exiting a geofence surrounding a location, the request including data specifying how long the reminder will remain in effect on the mobile device before it expires;

determining that a user-selectable permission setting on the mobile device indicates that permission is granted to share a location of the mobile device in response to the reminder being triggered; and setting the reminder on the mobile device.

14. The mobile device of claim 13, further comprising:

determining, by the mobile device, that the reminder is triggered; and sending information to the server indicating that the reminder has been triggered on the mobile device.

15. The mobile device of claim 13, wherein the request indicates that the reminder is triggered when the mobile device arrives at the location.

16. The mobile device of claim 13, wherein the request indicates that the reminder is triggered when the mobile device departs from the location.

17. The mobile device of claim 13, wherein the request indicates that the reminder is triggered when the mobile device enters or exits a geofence associated with the location.

18. The mobile device of claim 13, wherein the request indicates that the reminder is repeated.

19. A non-transitory, computer-readable storage medium having stored thereon instructions, which when executed by one or more processors of a mobile device, cause the one or more processors to perform operations comprising:

receiving, from a server, a request to set up a reminder that is triggered by the mobile device entering or exiting a geofence surrounding a location, the request including data specifying how long the reminder will remain in effect on the mobile device before it expires;

determining that a user-selectable permission setting on the mobile device indicates that permission is granted to share a location of the mobile device in response to the reminder being triggered; and setting the reminder on the mobile device.

20. The non-transitory, computer-readable storage medium of claim 19, further comprising:

determining, by the mobile device, that the reminder is triggered; and sending, by the mobile device, information to the server indicating that the reminder has been triggered on the mobile device.

* * * * *

UNITED STATES PATENT AND TRADEMARK OFFICE
CERTIFICATE OF CORRECTION

PATENT NO. : 10,103,934 B2
APPLICATION NO. : 15/004786
DATED : October 16, 2018
INVENTOR(S) : Raghu Pai et al.

It is certified that error appears in the above-identified patent and that said Letters Patent is hereby corrected as shown below:

In the Specification

Column 1, Line 14, delete "2013," and insert -- 2015, --.

Signed and Sealed this
Fifth Day of March, 2019

Andrei Iancu
*Director of the United States Patent and Trademark Office*